(12) United States Patent
Kitajima et al.

(10) Patent No.: US 6,674,262 B2
(45) Date of Patent: Jan. 6, 2004

(54) MOTOR CONTROL APPARATUS AND MOTOR CONTROL METHOD

(75) Inventors: Yasuhiko Kitajima, Kamakura (JP); Masahiro Tsukamoto, Yokohama (JP); Kouichirou Yonekura, Kamakura (JP); Kantaro Yoshimoto, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 40 days.

(21) Appl. No.: 09/986,086

(22) Filed: Nov. 7, 2001

(65) Prior Publication Data

US 2002/0097015 A1 Jul. 25, 2002

(30) Foreign Application Priority Data

Nov. 22, 2000 (JP) .......................... 2000-356117
Feb. 16, 2001 (JP) .......................... 2001-040550
Sep. 12, 2001 (JP) .......................... 2001-276887

(51) Int. Cl.[7] ................................. H02P 6/10
(52) U.S. Cl. ........................... 318/722; 318/254
(58) Field of Search ................... 318/138, 254, 318/439, 722, 798–801, 807

(56) References Cited

U.S. PATENT DOCUMENTS

| 4,163,928 A | * | 8/1979 | Patterson et al. ........... 318/573 |
| 4,980,617 A | | 12/1990 | Tajima et al. |
| 5,485,071 A | | 1/1996 | Bi et al. |
| 6,025,691 A | | 2/2000 | Kawabata et al. |
| 6,426,605 B1 | * | 7/2002 | Toliyat et al. .............. 318/801 |

FOREIGN PATENT DOCUMENTS

| EP | 0 982 844 | 3/2000 |
| EP | 1 087 517 | 3/2001 |
| JP | 8-331885 | 12/1996 |
| WO | WO 99/31793 | 6/1999 |

* cited by examiner

Primary Examiner—Bentsu Ro
(74) Attorney, Agent, or Firm—McDermott, Will & Emery

(57) ABSTRACT

A motor control apparatus comprises a fundamental current command value determining device that determines a fundamental current command value for a motor current based upon at least a torque command value for an AC motor, a higher harmonics current command value determining device that determines a higher harmonics current command value for the motor current and a current control device that controls the current flowing to the AC motor based upon the fundamental current command value and the higher harmonics current command value.

22 Claims, 28 Drawing Sheets

US 6,674,262 B2

MOTOR CONTROL APPARATUS AND MOTOR CONTROL METHOD

BACKGROUND OF THE INVENTION

1. Field of the Invention

The present invention relates to an apparatus and a method adopted to control the drive of an AC motor.

2. Description of the Related Art

A current control circuit that controls the current in a three-phase alternating current motor normally performs the control arithmetic operation by converting a three-phase alternating current to a direct current in order to facilitate the arithmetic operation (see Japanese Laid-Open Patent Publication No. H 08-331885). FIG. 33 shows the structure adopted in a three-phase alternating current motor control apparatus which constitutes the related art. In the control arithmetic operation performed in this motor control apparatus, a rotating orthogonal coordinate system (dq coordinate system) is used. In the rotating orthogonal coordinate system, the direction of the exciting current component in the current flowing through the three-phase alternating current motor is set along the d-axis and the direction of the torque current component in the current flowing through the three-phase alternating current motor is set along the q-axis perpendicular to the d-axis. The current control arithmetic operation is performed using a direct current value obtained by converting the three-phase alternating current value in the rotating orthogonal coordinate system to reduce the current control deviation.

Miniaturization and higher efficiency are achieved with regard to an AC motor by providing a rotor having internally embedded magnets, as shown in FIG. 34 and a stator assuming a concentrated windings structure. The rotor is able to effectively utilize the magnetic torque and the reluctance torque. A motor having this type of rotor is called an IPM (interior permanent magnet motor). The stator is capable of greatly reducing the coil end. A motor provided with the rotor and the stator having structures described above, which is called a concentrated winding IPM motor, has been attracting a great deal of interest as a motor capable of realizing miniaturization and a high degree of efficiency.

SUMMARY OF THE INVENTION

However, since the concentrated winding IPM motor described above, in which significant space harmonics manifest, poses various problems as detailed below. The space harmonics in a motor assuming a concentrated winding structure such as a concentrated winding IPM motor becomes significant because the small number of slots at each pole results in a more uneven distribution of the magnetic flux compared to that in a motor assuming a distributed winding structure. An explanation is given below as to why a uniform magnetic flux distribution cannot be achieved.

FIG. 35 shows an SPM motor assuming a surface magnet structure achieved by covering the surface of the rotor with magnets. Unlike in the SPM motor shown in FIG. 35, areas where magnets are embedded and areas where no magnet is embedded are present along the circumference of the rotor in the IPM motor with the internally embedded magnets shown in FIG. 34. Accordingly, while a uniform magnetic flux distribution is achieved in the SPM motor having a rotor, the surface of which is covered with magnets, a greater degree of change in the magnetic flux manifests in the IPM motor to result in a greater space harmonics component.

Greater space harmonics in the motor leads to a greater higher harmonics component in the current flowing to the motor, and thus, problems arise in that the extent to which the motor efficiency is improved is compromised and in that the extent of torque ripple becomes significant. In addition, since the harmonics component is superimposed on the fundamental wave component in the current, another problem manifests in that the current peak value increases. Namely, the motor control performance becomes poor due to the adverse effect of the space harmonics.

An object of the present invention is to provide a motor control apparatus and a motor control method that improve control performance in a motor with significant space harmonics.

The motor control apparatus according to the present invention comprises a fundamental current command value determining device that determines a fundamental current command value for a motor current based upon, at least, a torque command value for an AC motor, a higher harmonics current command value determining device that determines a higher harmonics current command value for the motor current and a current control device that controls the current flowing to the AC motor based upon the fundamental current command value and the higher harmonics current command value.

In the motor control method according to the present invention, a fundamental current command value for a motor current is determined based upon at least a torque command value for an AC motor, a higher harmonics current command value for the motor current is determined and the current flowing to the AC motor is controlled based upon the fundamental current command value and higher harmonics current command value.

DETAILED DESCRIPTION OF THE PREFERRED EMBODIMENTS (First Embodiment)

Figure 1:
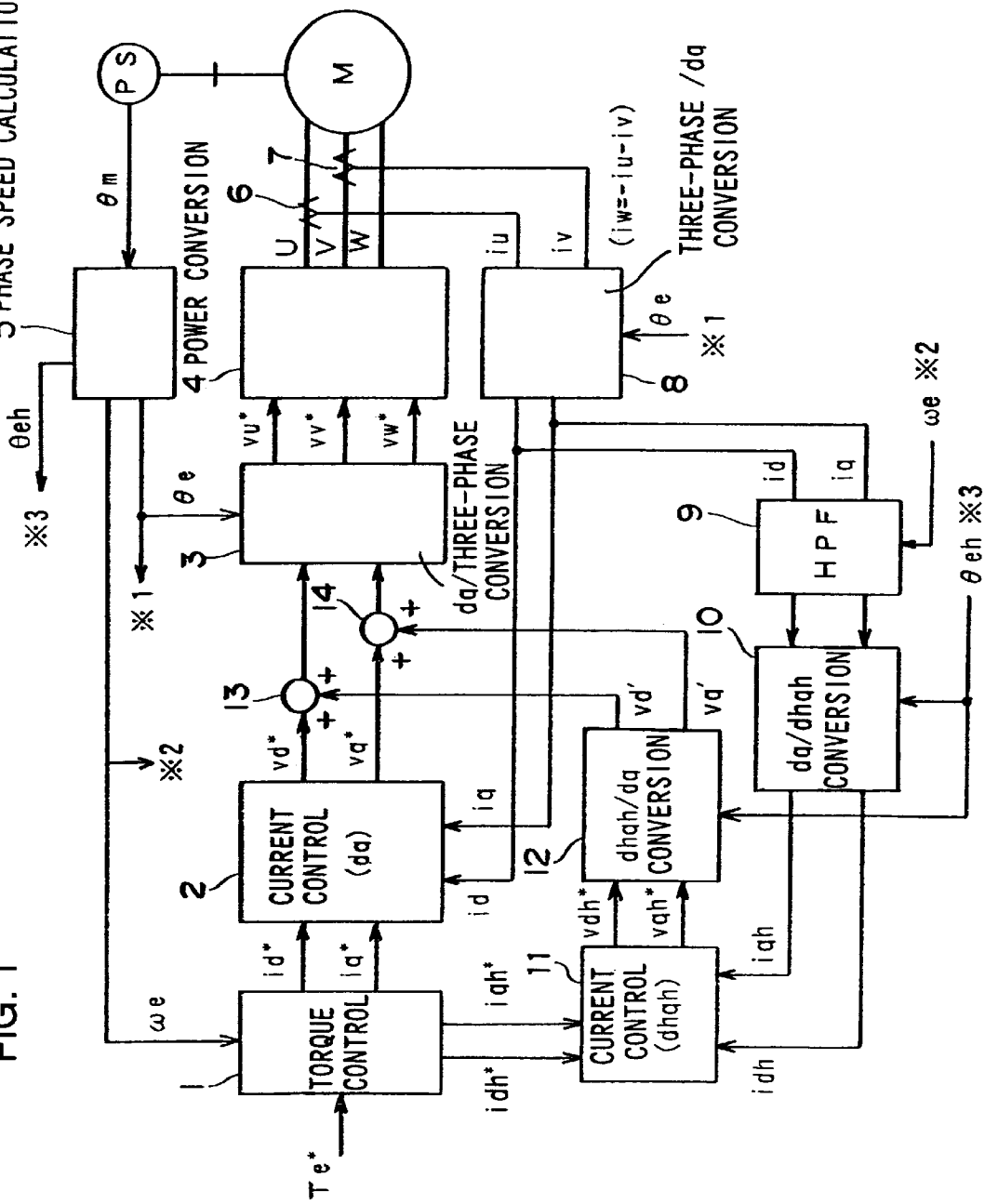
FIG. 1 shows the structure adopted in a first embodiment of the motor control apparatus according to the present invention.

Now, an explanation is given on the motor control apparatus achieved in the first embodiment to improve the motor efficiency and the motor output. FIG. 1 shows the structure of the motor control apparatus in the first embodiment. The motor control apparatus in the first embodiment implements vector control on a three-phase alternating current motor to realize torque control equivalent to the control achieved on a DC motor.

The motor control apparatus in the first embodiment is provided with a fundamental current control circuit and a higher harmonics current control circuit. The fundamental current control circuit implements control on the fundamental wave components of motor currents iu, iv and iw by using a dq coordinate system. The dq coordinate system, which is constituted with a d-axis corresponding to the exciting current components of the three-phase currents iu, iv and iw flowing to a three-phase alternating current motor M and a q-axis corresponding to the torque current components of the currents iu, iv and iw, rotates in synchronization with the motor rotation.

The higher harmonics current control circuit controls the higher harmonics components contained in the motor currents iu, iv and iw by using a higher harmonics coordinate system. The higher harmonics coordinate system is an orthogonal coordinate system that rotates with the frequency of a higher harmonics component of a specific order manifesting when the motor currents iu, iv and iw are controlled by engaging the fundamental current control circuit alone, and it rotates with a frequency which is an integral multiple of the frequency of fundamental wave components of the motor currents iu, iv and iw.

Figure 33:
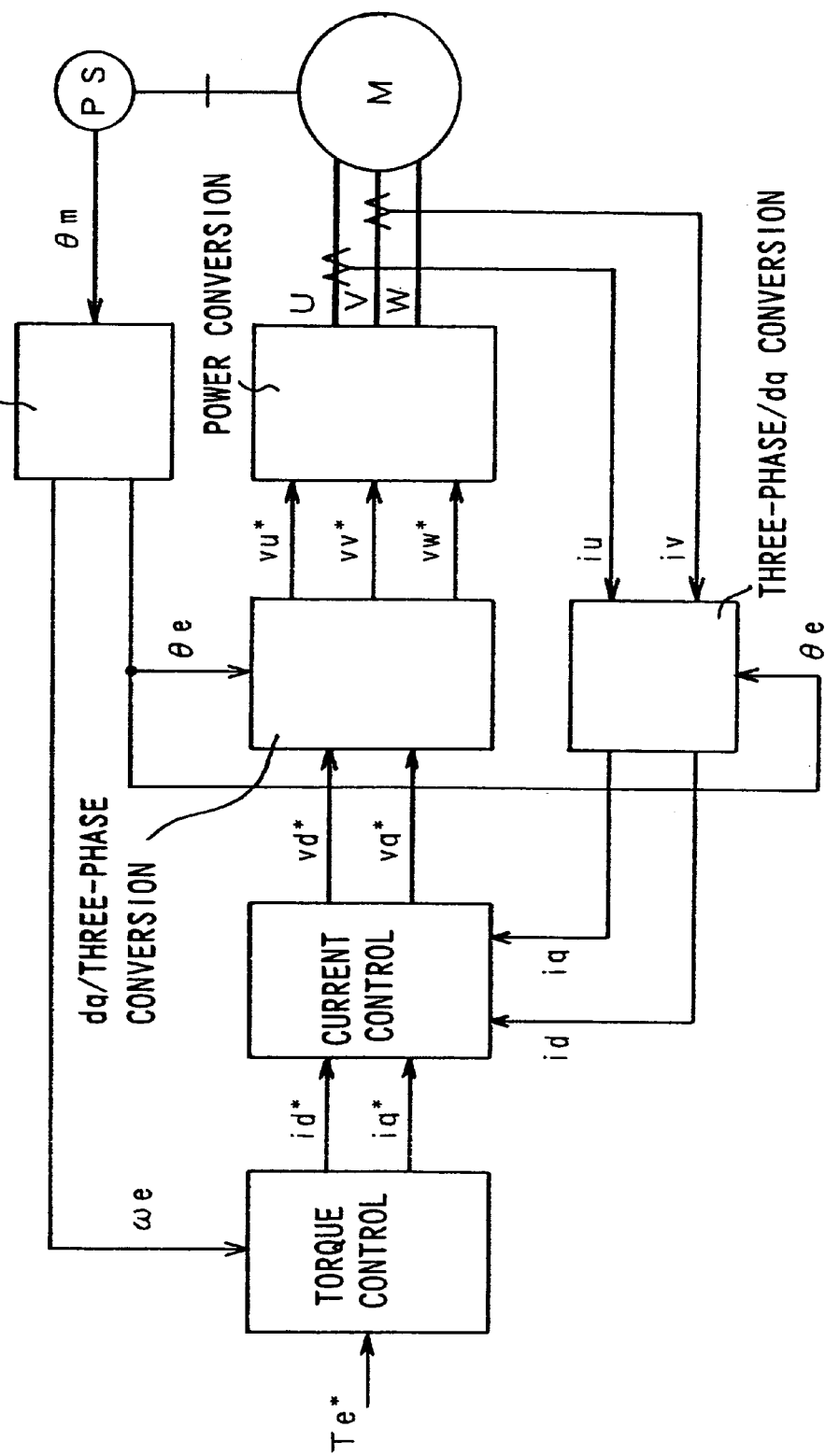
FIG. 33 shows the structure adopted in a three-phase alternating current motor control apparatus in the related art.
Figure 34:
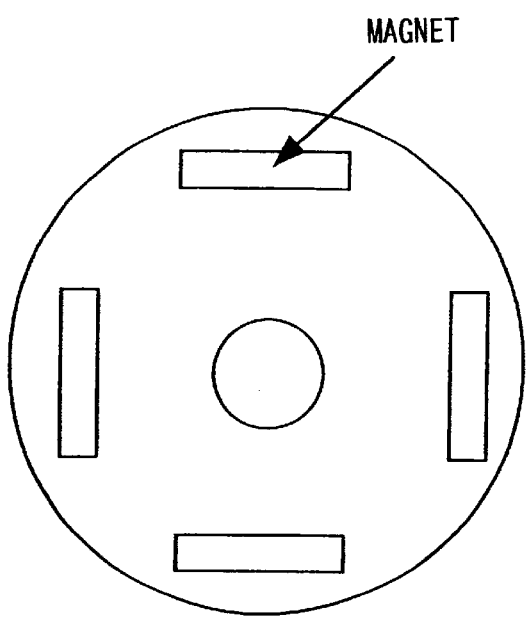
FIG. 34 shows the structure of an IPM motor.
Figure 35:
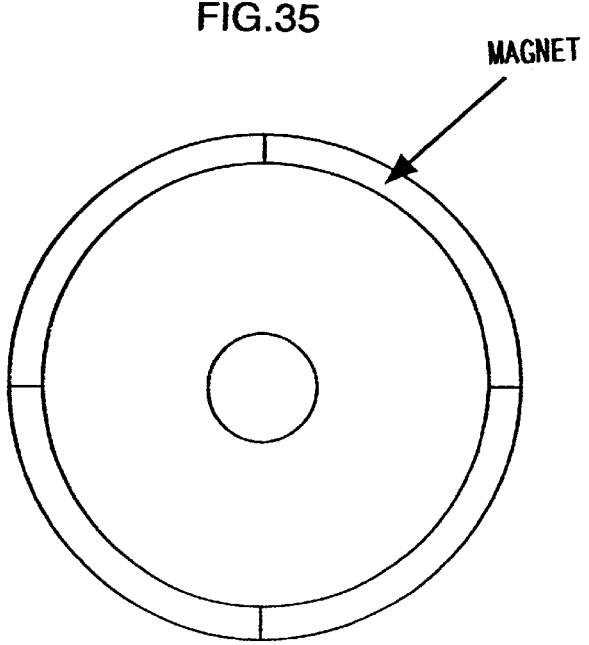
FIG. 35 shows the structure of an SPM motor.

The fundamental current control circuit includes a torque control unit 1, a fundamental current control unit 2, a dq/three-phase conversion unit 3, a power conversion unit 4, a phase speed calculation unit 5 and a three-phase/dq conversion unit 8. It is to be noted that the structure of the fundamental current control circuit is identical to the structure adopted in the motor control apparatus in the related art illustrated in FIG. 33.

The torque control unit 1 calculates a d-axis current command value id* and a q-axis current command value iq* in the dq coordinate system and also calculates dh-axis current command values idh* and a qh-axis current command value iqh* in the higher harmonics coordinate system dhqh by using current command value tables, based upon the torque command value Te* and a motor rotating speed we, as detailed later in reference to FIG. 5. The resulting current command values id* and iq* are provided to the fundamental current control unit 2, whereas the current command values idh* and iqh* that have been calculated are provided to a higher harmonics current control unit 11.

The fundamental current control unit (dq-axis current control unit) 2 calculates fundamental wave voltage command values vd* and vq* corresponding to the d-axis and the q-axis in order to match the actual currents id and iq along the d-axis and the q-axis respectively with the current command values id* and iq*. The dq/three-phase conversion unit 3 converts voltage command values (vd*+vd' and vq*+vq') along the d-axis and the q-axis to three-phase alternating current voltage command values vu*, vv* and vw* based upon the phase θe of dq coordinate system viewed from the three-phase AC coordinate system. The voltage command values (vd*+vd') and (vq*+vq') corresponding to the d-axis and the q-axis are to be detailed later. The three-phase AC voltage command values vu*, vv* and vw* resulting from the conversion are provided to the power conversion unit 4.

The power conversion unit 4 employs a power conversion element such as an IGBT to switch the DC voltage from a DC source (not shown) which may be a battery based upon the three-phase AC voltage command values vu*, vv* and vw* and applies three-phase AC voltages U, V and W to the three-phase alternating current motor M. An encoder PS linked to the three-phase alternating current motor M detects the rotating position θm of the motor M. The rotating position θm thus detected is provided to the phase speed calculation unit 5. The phase speed calculation unit 5 calculates the rotating speed ωe of the motor M and the phase θe of the dq coordinate system viewed from the three-phase AC coordinate system based upon the rotating position signal θm provided by the encoder PS.

Current sensors 6 and 7 respectively detect the actual currents iu and iv at the U-phase and the V-phase in the three-phase alternating current motor M. The detected U-phase current iu and V-phase current iv are provided to the three-phase/dq conversion unit 8. The three-phase/dq conversion unit 8 converts the actual currents iu, iv and iw (=−iu−iv) at the three-phase alternating current motor M to the actual current id along the d-axis and the actual current iq along the q-axis based upon the phase θe of the dq coordinate system viewed from the three-phase AC coordinate system.

The higher harmonics current control circuit includes the three-phase/dq conversion unit 8, a high pass filter 9, a dq/dhqh conversion unit 10, the higher harmonics current control unit 11 and a dhqh/dq conversion unit 12. The high pass filter 9 extracts higher harmonics components id_h and iq_h by filtering the actual current id along the d-axis and the actual current iq along the q-axis based upon the motor rotating speed ωe. The dq/dhqh conversion unit 10, which has the higher harmonics coordinate system dhqh mentioned earlier, converts the higher harmonics components id_h of the actual current id along the d-axis and iq_h of the actual current iq along the q-axis to actual currents idh and iqh in the higher harmonics coordinate system dhqh. When θeh represents the phase of the dhqh coordinate system viewed from the dq coordinate system, the actual currents idh and iqh in the dhqh coordinate system are calculated through the following expression (1).

$$\begin{bmatrix} idh \\ iqh \end{bmatrix} = \begin{bmatrix} \cos\theta eh & \sin\theta eh \\ -\sin\theta eh & \cos\theta eh \end{bmatrix} \begin{bmatrix} id\_h \\ iq\_h \end{bmatrix} \quad (1)$$

It is to be noted that if the higher harmonics components in the three-phase AC coordinate system are of the fifth order, θeh=−6θe+θeo (with θeo representing the phase difference between θe=0 and θeh=0).

The higher harmonics current control unit (dhqh axis current control unit) 11 calculates higher harmonics voltage command values vdh* and vqh* respectively corresponding to the dh-axis and the qh-axis so as to match the actual currents idh and iqh along the dh-axis and the qh-axis with current command values idh* and iqh*. The dhqh/dq conversion unit 12 converts the higher harmonics voltage command values vdh* and vqh* along the dh-axis and the qh-axis to higher harmonics voltage command values vd' and vq' along the d-axis and the q-axis respectively. This conversion may be achieved by reversing conversion in expression (1). The voltage command values vd' and vq' resulting from the conversion are provided to adders 13 and 14. The adders 13 and 14 obtain the ultimate d-axis voltage command value (vd*+vd') and q-axis voltage command value (vq*+vq') by adding the higher harmonics voltage command values vd' and vq' generated at the higher harmonics current control circuit to the fundamental voltage command values vd* and vq* generated at the fundamental current control unit 2.

Figure 2:
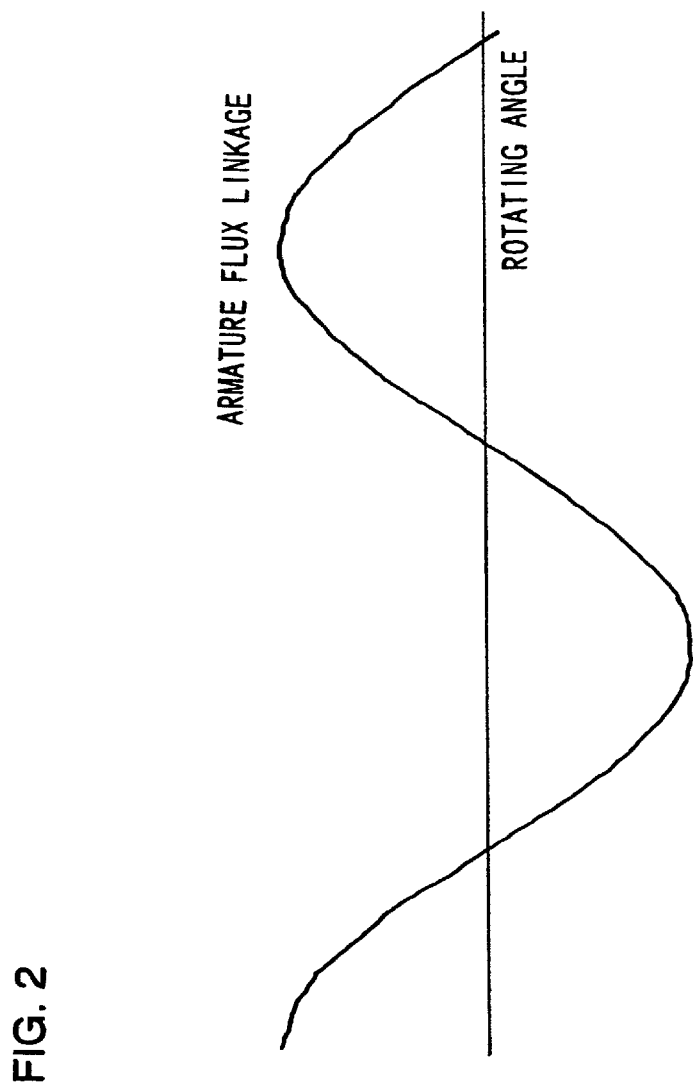
FIG. 2 shows the armature flux linkage (U-phase winding) formed by the magnets in an IPM motor when no space harmonics are present.
Figure 3:
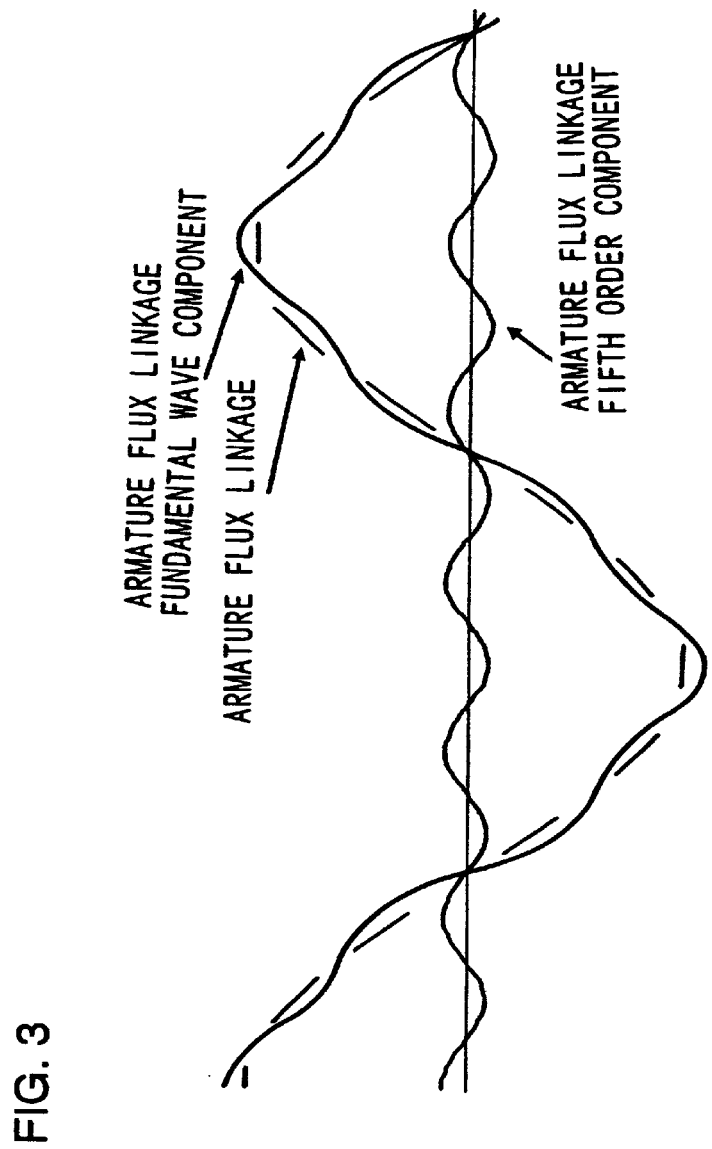
FIG. 3 shows the armature flux linkage (U-phase winding) formed by the magnets in the IPM motor when a fifth-order space harmonics are present.

Now, the fundamental coordinate system dq and the higher harmonics coordinate system dhqh are explained by using an IPM motor in which significant space harmonics manifests as an example. FIG. 2 shows the armature flux linkage (U-phase winding) formed by the magnets in the IPM motor when there is no space harmonic present. FIG. 3 shows the armature flux linkage (U-phase winding) formed by the magnets in the IPM motor when there are fifth order space harmonic components.

The magnetic flux changes by achieving the shape of a sine wave relative to the change in the rotating angle of the motor. Normally, the direction of the armature flux linkage vector is represented by the d-axis and the direction perpendicular to the d-axis is represented by the q-axis. Under normal circumstances, physical quantities such as the voltages, the currents or the like in the three-phase AC coordinate system are converted to physical quantities in the dq coordinate system (fundamental coordinate system) and motor control is implemented in the dq coordinate system. In the motor control apparatus in this embodiment, the fundamental wave components in the physical quantities such as voltages or currents are handled in the dq coordinate system whereas the higher harmonics components are handled in the dhqh coordinate system (higher harmonics coordinate system) by assuming the direction of the armature flux linkage vector along the dh-axis and assuming the direction perpendicular to the dh-axis along the qh-axis for each order.

As shown in FIG. 3, if a fifth-order higher harmonics component is contained, the armature flux linkage is divided into a fundamental wave component magnetic flux and a fifth-order higher harmonics component magnetic flux, with the direction of the armature flux linkage vector of the fundamental wave component assumed along the d-axis and with the direction perpendicular to the d-axis assumed along the q-axis, and the direction of the armature flux linkage vector of the fifth-order higher harmonics component assumed along the dh-axis and the direction perpendicular to the dh-axis assumed along the qh-axis. Accordingly, the fundamental coordinate system dq constitutes a coordinate system that rotates in synchronization with the fundamental wave component of the armature flux linkage and the higher harmonics coordinate system dhqh constitutes a coordinate system that rotates in synchronization with the higher order harmonics component of the armature flux linkage.

Since the dq coordinate system rotates in synchronization with the motor rotation, the fundamental current in the motor can be handled as a DC quantity in the dq coordinate system. When ωeh represents the angular frequency of the higher harmonics current and ωe represents the base angular frequency of the motor current, the angular frequency ωeh_dq of the higher harmonics current in the dq coordinate system is expressed through the following equation (2).

$$\omega eh\_dq = \omega eh - \omega e \quad (2)$$

As mathematical expression (2) clearly indicates, the higher harmonics component of the motor current cannot be handled as a DC quantity even in the dq coordinate system. Because of this, when the motor rotating speed increases to result in an increase in the frequency of the motor current, the frequency of the higher harmonics component of the motor current becomes higher in correspondence to the motor rotating speed, and thus, the actual current cannot conform to the current command value in a control method in which only the dq coordinate system is used.

In contrast, in the motor control apparatus in the embodiment in which the fundamental wave component of the motor current is controlled by using the dq coordinate system and the higher harmonics component of the motor current is controlled by using the dhqh coordinate system, the higher harmonics component is allowed to conform to the current with higher accuracy. A higher harmonics current contains higher harmonics components of a plurality of orders. For purposes of achieving simplification, it is assumed in the following explanation that a kth-order higher harmonics component, which manifests a greater degree of influence among the higher harmonics components contained in the higher harmonics current represents the control target.

Now, an explanation is given on the efficiency and the output of a motor upon which drive control is implemented by a motor control apparatus in the related art that controls the motor torque based upon the fundamental wave component magnetic flux and the fundamental wave component current. The output torque Te of the motor that contains a space harmonic component is expressed as in the following expression (3).

$$Te = P(\phi d \cdot id + \phi q \cdot iq) \qquad (3)$$
$$= P\{(\phi d\_1 + \phi d\_h)(iq\_1 + iq\_h) + (\phi q\_1 + \phi q\_h)(id\_1 + id\_h)\}$$
$$= P\{(\phi d\_1 \cdot iq\_1 + \phi q\_1 \cdot id\_1) + (\phi d\_h \cdot iq\_h + \phi q\_h \cdot id\_h) +$$
$$(\phi d\_h \cdot iq\_1 + \phi q\_h \cdot id\_1) + (\phi d\_1 \cdot iq\_h + \phi q\_1 \cdot id\_h)\}$$

In the expression presented above, P represents the polar logarithm, Ød represents the d-axis armature flux linkage, Ød_1 represents the fundamental wave component of the d-axis armature flux linkage, Ød_h represents the higher harmonics component of the d-axis armature flux linkage, Øq represents the q-axis armature flux linkage, Øq_1 represents the fundamental wave component of the q-axis armature flux linkage and Øq_h represents the higher harmonics component of the q-axis armature flux linkage. In addition, id represents the d-axis current, id_1 represents the fundamental wave component of the d-axis current, id_h represents the higher harmonics component of the d-axis current, iq represents the q-axis current, iq_1 represents the fundamental wave component of the q-axis current and iq_h represents the higher harmonics component of the q-axis current.

It is to be noted that with id_1 representing the fundamental wave component of the d-axis current id and id_h representing the higher harmonics component of the d-axis current id in the fundamental coordinate system dq, the relationship as expressed in the following expression (4) is achieved.

$$id = id\_1 + id\_h \qquad (4)$$

In addition, with iq_1 representing the fundamental wave component of the q-axis current iq and iq_h representing the higher harmonics component of the q-axis current iq in the fundamental coordinate system dq, the relationship as expressed in the following expression (5) is achieved.

$$iq = iq\_1 + iq\_h \qquad (5)$$

In the following explanation, the fundamental currents id_i and iq_i and the higher harmonics currents id_h and iq_h are handled in the fundamental coordinate system dq and ultimately, the d-axis higher harmonics current id_h and the q-axis higher harmonics current iq_h are converted to the dh-axis higher harmonics current idh and the qh-axis higher harmonics current iqh to facilitate understanding thereof.

The first term in the right member in expression (3) represents the torque generated based upon the motor armature flux linkage fundamental wave components and the current fundamental wave components. The second term represents the torque generated based upon the motor armature flux linkage higher harmonics components and the current higher harmonics components. The third term represents the torque generated based upon the motor armature flux linkage higher harmonics components and the current fundamental wave components. The fourth term represents the torque generated based upon the motor armature flux linkage fundamental wave components and the current higher harmonics components.

Since the torques expressed in the third term and the fourth term in the right member in expression (3) each contain the product of an armature flux linkage component and a current component, the order of which is different from that of the armature flux linkage component, their time averages are both 0. Accordingly, the torques expressed in the third term and the fourth term do not constitute a contributing factor in the average torque output from the motor. However, the torque expressed in the first term is constituted of the product of the fundamental wave components of the armature flux linkage and the fundamental wave components of the corresponding currents, and thus, it constitutes a contributing factor in the average torque. The torque expressed in the second term, too, which contains the products of the higher harmonics components of an armature flux linkage and the higher harmonics components of the corresponding currents of the same order, constitutes a contributing factor in the average torque. The motor control apparatus in the related art implements fundamental wave current control in the dq coordinate system, i.e., control for eliminating current distortion, and accordingly, only utilizes the torque expressed in the first term of the right member in expression (3). As a result, the motor efficiency is compromised and the output value is lowered in the control apparatus in the related art.

In the motor control apparatus in the first embodiment, the motor torque is controlled based upon the magnetic flux higher harmonics components and the current higher harmonics components as well as implementing motor torque control based upon the magnetic flux fundamental wave components and the current fundamental wave components. Thus, the motor efficiency is improved and a better output is achieved.

Figure 4A:
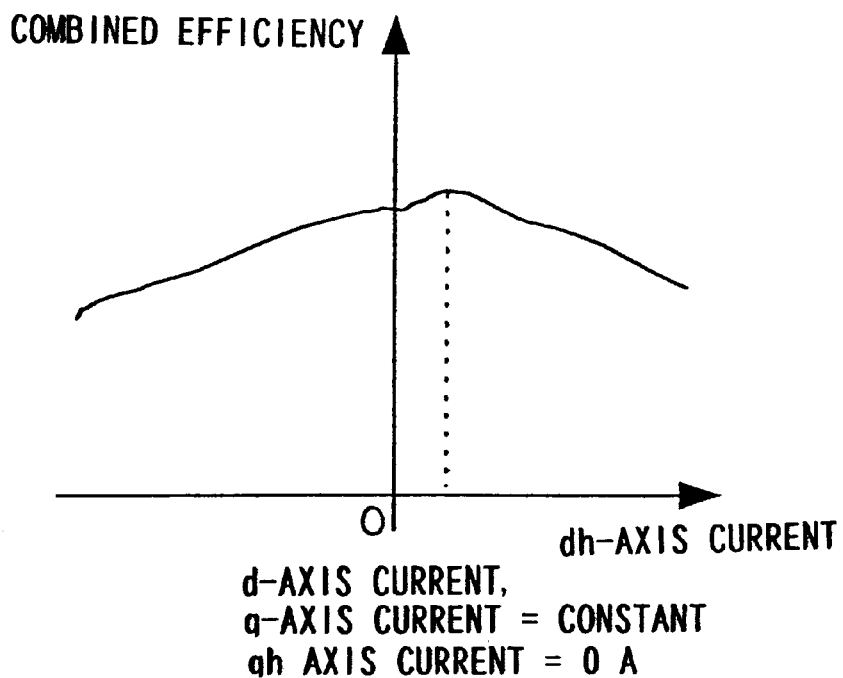
FIGS. 4A and 4B show the relationship between the higher harmonics current component and the combined efficiency achieved by setting the dq-axis currents id and iq, which are the fundamental current components at constant values.
Figure 4B:
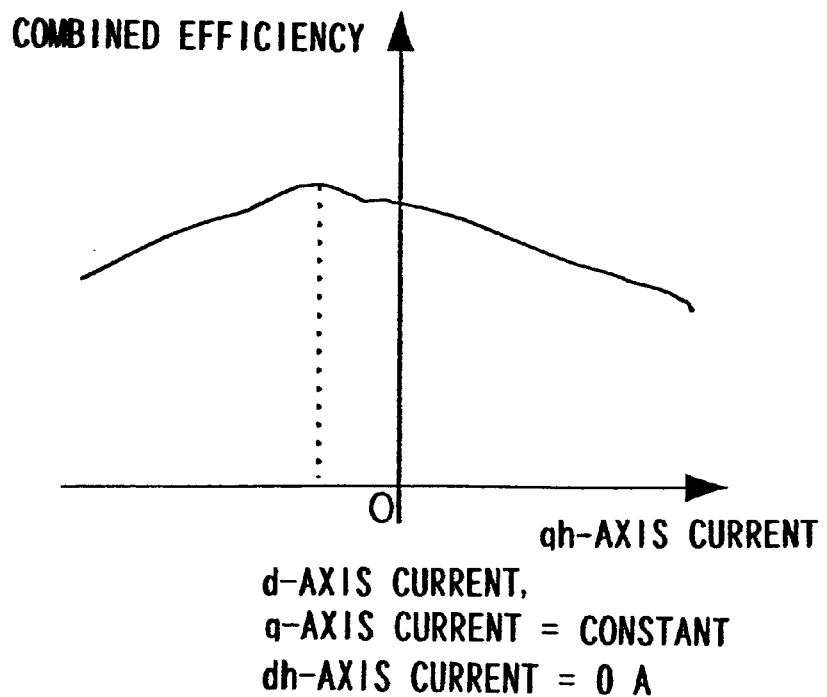

Now, the effect of the higher harmonics currents flowing to the motor on the motor efficiency is examined. FIGS. 4A and 4B each show the relationship between the higher harmonics current component and the combined motor efficiency achieved with the d-axis current id and q-axis current iq corresponding to the fundamental current components both set at a constant level. FIG. 4A shows the combined efficiency relative to the dh-axis current idh achieved by setting the qh axis current iqh to 0, whereas FIG. 4B shows the combined efficiency relative to the qh-axis current iqh achieved by setting the dh-axis current idh to 0. As the figures clearly indicate, the maximum efficiency is not achieved when the higher harmonics current idh or iqh is set to 0 and the efficiency is maximized when there is some higher harmonics current flowing. In other words, the combined efficiency is improved by adopting a control method in which the higher harmonics currents are superimposed on the fundamental currents over a control method achieved by implementing motor drive control using the fundamental currents alone.

Figure 5:
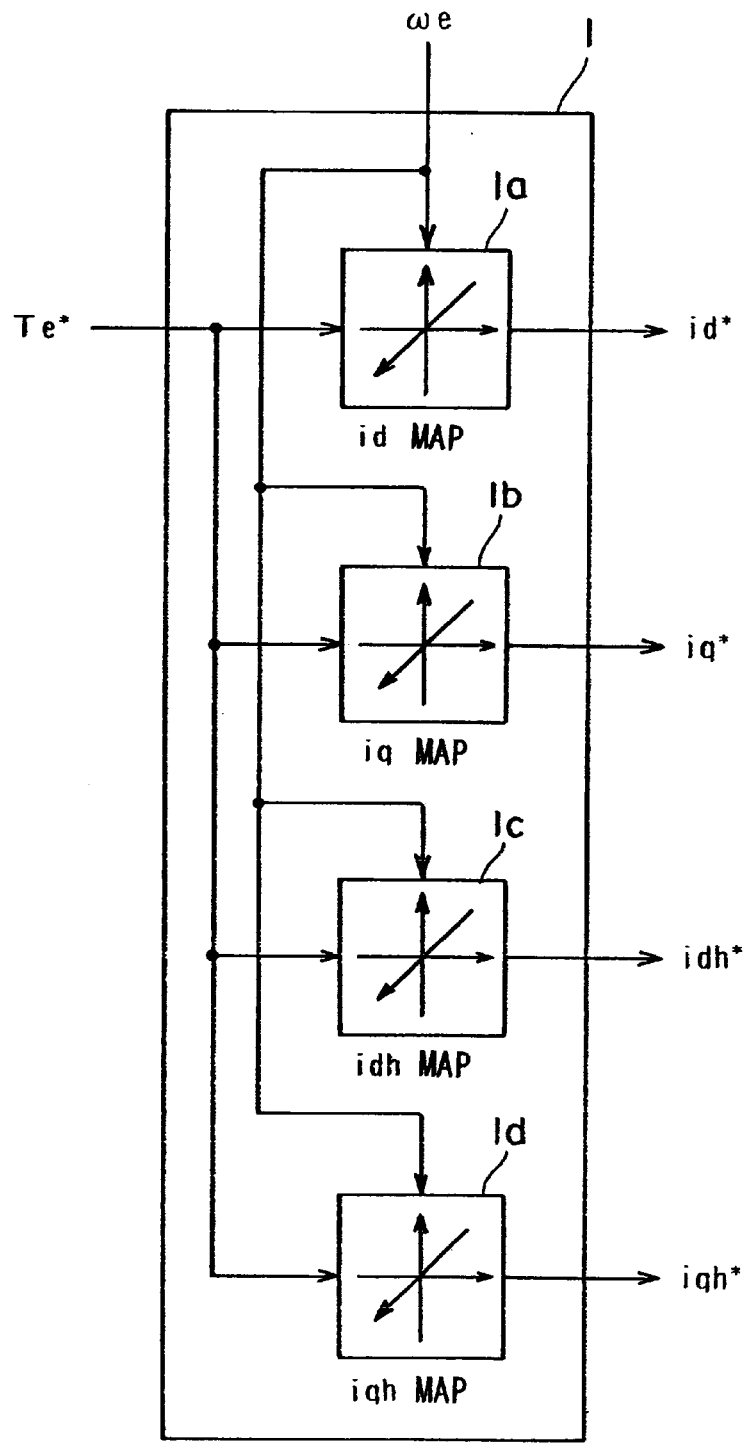
FIG. 5 shows in detail the structure adopted in the torque control unit in the motor control apparatus in the first embodiment.

FIG. 5 shows in detail the structure adopted in the torque control unit 1 in the first embodiment. The torque control unit 1 calculates a d-axis current command value id* corresponding to the torque command value Te* and the motor rotating speed ωe by looking up a maximum efficiency id map 1a. In the maximum efficiency id map 1a, d-axis current command value data relative to the torque command value Te* and the motor rotating speed ωe are stored. In addition, the torque control unit 1 calculates a q-axis current command value iq* corresponding to the torque command value Te* and the motor rotating speed e by looking up a maximum efficiency iq map 1b. In the maximum efficiency iq map 1b, q-axis current command value data relative to the torque command value Te* and the motor rotating speed ωe are stored.

Likewise, the torque control unit 1 calculates a dh-axis current command value idh* corresponding to the torque command value Te* and the motor rotating speed ωe by looking up a maximum efficiency idh map 1c. In the maximum efficiency idh map 1c, dh-axis current command value data relative to the torque command value Te* and the motor rotating speed ωe are stored. The torque control unit 1 also calculates a qh-axis current command value iqh* corresponding to the torque command value Te* and the motor rotating speed ωe by looking up a maximum efficiency iqh map 1d. In the maximum efficiency iqh map 1d, qh-axis current command value data relative to the torque command value Te* and the motor rotating speed ωe are stored.

In the maps 1a~1d, the fundamental current command values and the higher harmonics current command values that achieve the maximum combined efficiency among combinations of current command values for matching the motor torque Te to the torque command value Te* are stored.

The combined motor efficiency is maximized in the motor control apparatus in the first embodiment by ensuring that the torque Te, which matches the torque command value Te* with a high degree of efficiency is output from the motor at any motor rotating speed ωe.

(Second Embodiment)

A motor control apparatus achieved in the second embodiment that minimizes the extent of motor torque rippling is now explained. It is to be noted that since the motor control apparatus in the second embodiment assumes a structure identical to the structure of the motor control apparatus in the first embodiment illustrated in FIG. 1 except for the structure adopted in the torque control unit 1, an explanation of the overall structure is omitted and the following explanation focuses on the difference.

While the torques expressed in the third term and the fourth term of the right member in expression (3), which each contain the product of an armature flux linkage and currents of different orders do not constitute contributing factors in the average torque, they constitute torque ripple components. In the motor control apparatus in the related art, in which the fundamental current control is implemented in dq coordinate system, i.e., control is implemented by assuming that there is no higher harmonics component in the current, the value of the fourth term is 0, but the value of the third term is not 0, thereby constituting a torque ripple component. In other words, the motor control apparatus in the related art is not capable of reducing the torque ripple in a motor manifesting a significant space harmonic. Since the torque ripple in the motor causes discomfort to passengers in an electric car, it is crucial to reduce the extent of torque ripple.

In the motor control apparatus in the second embodiment, current requirements for completely eliminating torque ripple are ascertained by analyzing the relationship between the current in an IPM motor in which space harmonics are present and the output torque of the IPM motor.

The output torque Te of an IPM motor may be expressed as the sum of the magnet torque Tem and the reluctance torque Ter.

$$Te = Tem + Ter \quad (6)$$
$$= P(\Phi dm \cdot iq - Lqd \cdot id \cdot iq)$$

In the expression given above, Tem represents the magnet torque, Ter represents the reluctance torque, $\phi dm$ represents the armature flux linkage (corresponding to the magnets) and Lqd represents the difference between the d-axis inductance and the q-axis inductance ($=Lq-Ld=Lqd\_1+Lqd\_h$).

The magnet torque Tem is calculated through the following expression (7).

$$Tem = P \cdot \phi dm \cdot iq \quad (7)$$
$$= P(\phi dm\_1 + \phi dm\_h)(iq\_1 + iq\_h)$$
$$= P(\phi dm\_1 \cdot iq\_1 + \phi dm\_h \cdot iq\_1 + \phi dm\_1 \cdot iq\_h + \phi dm\_h \cdot iq\_h)$$
$$= P \cdot \phi dm\_1 \cdot iq\_1 + P(\phi dm\_h \cdot iq\_1 + \phi dm\_1 \cdot iq\_h + \phi dm\_h \cdot iq\_h)$$

With $\emptyset dm\_1$ representing the fundamental wave component (corresponding to the magnets) of the armature flux linkage and $\emptyset dm\_h$ representing the higher harmonics component (corresponding to the magnets) of the armature flux linkage. The first term in the right member in expression (7) represents the fundamental wave component torque and the second term represents the torque ripple component. Accordingly, by controlling the current to set the value of the second term to 0, the ripple component in the magnet torque can be eliminated. In other words, the following equation (8) must be true.

$$\emptyset dm\_h \cdot iq\_1 + \emptyset dm\_1 \cdot iq\_h + \emptyset dm\_h \cdot iq\_h = 0 \quad (8)$$

By modifying expression (8), expression (9) is obtained.

$$iq\_h = -\emptyset dm\_h \cdot iq\_1/(\emptyset dm\_1 + \emptyset dm\_h) \quad (9)$$

If the fundamental wave component of the armature flux linkage formed by the magnets is sufficiently larger than the higher harmonics component (Ødm_1>>Ødm_h), expression (9) can be approximated to the following expression (10).

$$iq\_h = -Ødm\_h \cdot iq\_1 / Ødm\_1 \quad (10)$$

Thus, by implementing control so as to set the higher harmonics component iq_h of the q-axis current to the value expressed in expression (10), the ripple in the magnet torque Tem can be eliminated.

The reluctance torque Ter is expressed as in the following expression (11).

$$\begin{aligned}
Ter &= -P \cdot Lqd \cdot id \cdot iq \quad (11)\\
&= P(Lqd\_1 + Lqd\_h)(id\_1 + id\_h)(iq\_1 + iq\_h)\\
&= P(Lqd\_1 \cdot iq\_1 + Lqd\_h \cdot iq\_1 + Lqd\_1 \cdot iq\_h + Lqd\_h \cdot iq\_h)(id\_1 + id\_h)\\
&= P \cdot Lqd\_1 \cdot iq\_1 \cdot id\_1 +\\
&\quad P(Lqd\_h \cdot iq\_1 + Lqd\_1 \cdot iq\_h + Lqd\_h \cdot iq\_h)id\_1 +\\
&\quad P(Lqd\_1 \cdot iq\_1 + Lqd\_h \cdot iq\_1 + Lqd\_1 \cdot iq\_h + Lqd\_h \cdot iq\_h)id\_h
\end{aligned}$$

The first term in the right member in expression (11) represents the fundamental wave component of the reluctance torque and the second term and the third term in the right member each represent a torque ripple component. Accordingly, by implementing control on the currents so as to ensure that the sum of the second term and the third term is 0, the overall ripple component in the reluctance torque can be eliminated.

$$\begin{aligned}
(Lqd\_1 \cdot iq\_1 + Lqd\_h \cdot iq\_1 + Lqd\_1 \cdot iq\_h + Lqd\_h \cdot iq\_h)id\_h = \quad (12)\\
-(Lqd\_h \cdot iq\_1 + Lqd\_1 \cdot iq\_h + Lqd\_h \cdot iq\_h)id\_1 \therefore id\_h =\\
-(Lqd\_h \cdot iq\_1 + Lqd\_1 \cdot iq\_h + Lqd\_h \cdot iq\_h)id\_\\
1/(Lqd\_1 \cdot iq\_1 + Lqd\_h \cdot iq\_1 + Lqd\_1 \cdot iq\_h + Lqd\_h \cdot iq\_h)
\end{aligned}$$

By assuming that the higher harmonics components are sufficiently smaller than the fundamental wave components with regard to the motor parameters and the motor currents, expression (12) can be approximated to the following expression (13).

$$id\_h = -(Lqd\_h \cdot iq\_1 + Lqd\_1 \cdot iq\_h)id\_1/(Lqd\_1 \cdot iq\_1) \quad (13)$$

Thus, by implementing control so as to set a higher harmonics component id h of the d-axis current to the value expressed in expression (13), the ripple in the reluctance torque can be eliminated.

As explained above, by implementing control so as to set the q-axis higher harmonics component current iq_h to the value expressed in expression (10) and implementing control so as to set the d-axis higher harmonics component current id_h to the value expressed in expression (13), the torque ripple in the motor can be reduced. Since the higher harmonics components id_h and iq_h in the dq-axis coordinate system can be converted to higher harmonics component currents along the dh-axis and the qh-axis in the higher harmonics coordinate system through expression (1), a dh-axis current command value idh* and a qh-axis current command value iqh* are calculated by incorporating expressions (10) and (13) into expression (1). By implementing control through the higher harmonics current control unit 11 so as to match the higher harmonics currents id_h and iq_h to the current command values idh* and iqh* respectively, the torque ripple in the motor can be minimized.

Figure 6:
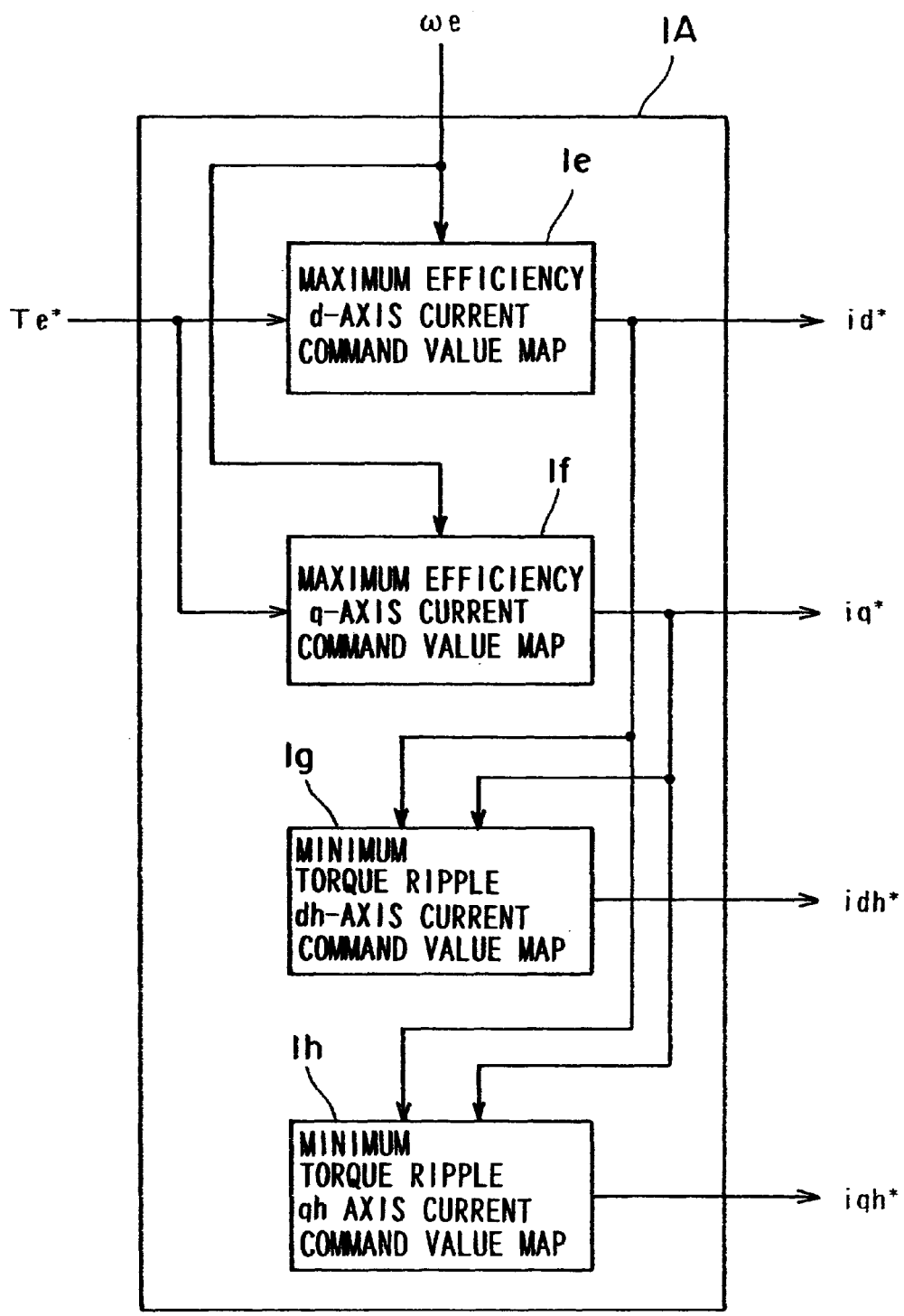
FIG. 6 shows in detail the structure adopted in the torque control unit in the motor control apparatus in a second embodiment.

FIG. 6 shows in detail the structure adopted in a torque control unit 1A in the second embodiment. In the motor control apparatus in the second embodiment, the torque control unit 1A is employed instead of the torque control unit 1 shown in FIG. 1. The torque control unit 1A calculates a d-axis current command value id* corresponding to the torque command value Te* and the motor rotating speed ωe by looking up a maximum efficiency id map 1e. In the maximum efficiency id map 1e, d-axis current command value data relative to the torque command value Te* and the motor rotating speed ωe are stored. In addition, the torque control unit 1A calculates a q-axis current command value iq* corresponding to the torque command value Te* and the motor rotating speed ωe by looking up a maximum efficiency iq map 1f. In the maximum efficiency iq map 1f, q-axis current command value data relative to the torque command value Te* and the motor rotating speed ωe are stored.

The torque control unit 1A also calculates a dh-axis current command value idh* corresponding to d-axis and q-axis current command values id* and iq* by looking up a minimum torque ripple idh map 1g. In the minimum torque ripple idh map 1g, dh-axis current command value data corresponding to the d-axis and q-axis current command values are stored. Likewise, the torque control unit 1A calculates a qh-axis current command value iqh* corresponding to the d-axis and q-axis current command values id* and iq* by looking up a minimum torque ripple iqh map 1h. In the minimum torque ripple iqh map 1h, qh-axis current command value data relative the d-axis and q-axis current command values are stored.

In the maps 1e~1h, the fundamental current command values and the higher harmonics current command values that minimize the torque ripple while satisfying expressions (10) and (13) among combinations of current command values for matching the motor torque Te to the torque command value Te* are stored. Since an error occurs if these command values are ascertained through an arithmetic operation, data of measured values obtained by measuring the fundamental currents and the higher harmonics currents that achieve the minimum torque ripple in advance may be used.

In the motor control apparatus in the second embodiment, the torque Te that matches the torque command value Te* can be output from the motor while minimizing the torque ripple at any motor rotating speed we. As a result, the motor vibration and the motor noise attributable to the torque ripple can be reduced. In addition, by adopting the motor control apparatus in the second embodiment in conjunction with an electric car using the motor as a drive source, the passenger comfort is improved.

(Third Embodiment)

The motor control apparatus achieved in the third embodiment minimizes the voltage ripple. It is to be noted that since the motor control apparatus in the third embodiment assumes a structure identical to the structure of the motor control apparatus in the first embodiment illustrated in FIG. 1 except for the structure adopted in the torque control unit 1, an explanation of the overall structure is omitted and the following explanation focuses on the difference.

Figure 7:
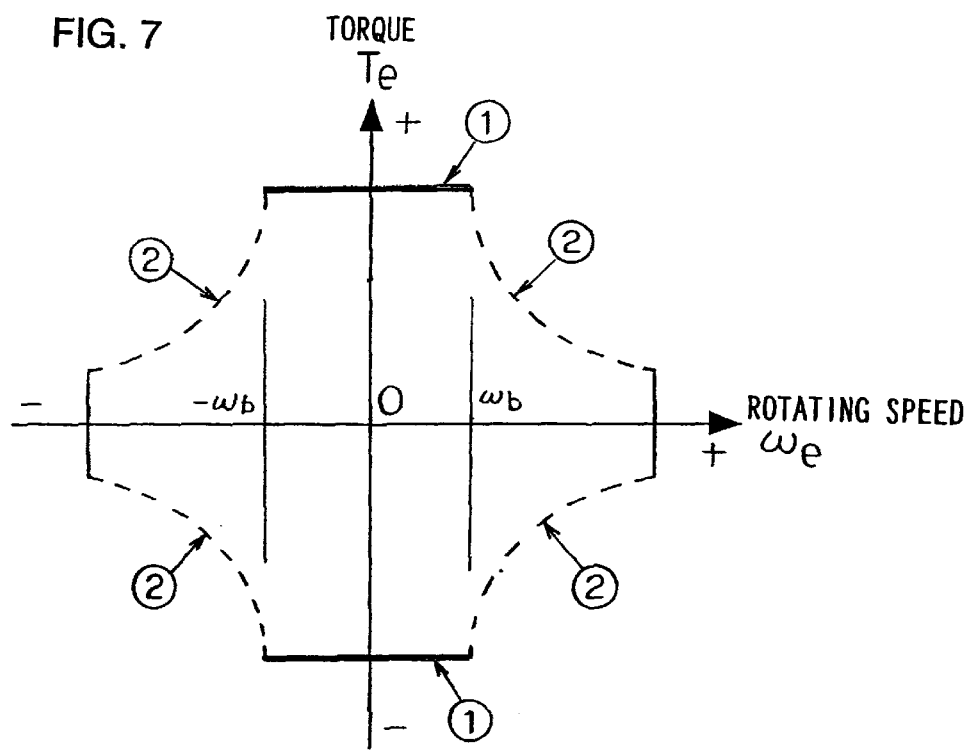
FIG. 7 shows the motor output characteristics.

FIG. 7 shows the relationship of the torque Te to the rotating speed ωe of the motor M, i.e., the output characteristics of the motor M. The maximum torque of the motor M within the range over which the rotating speed we is between the base rotating speed−ωb and the base rotating speed+ωb is indicated by the bold line ① representing the maximum torque line. The maximum torque of the motor M in the range over which the rotating speed ωe exceeds the base rotating speed ±ωb is identified by the dotted line ② representing the maximum output line.

Since the rated current of the power element at the power conversion unit 4 is determined in conformance to the maximum torque line ① under normal circumstances, a fundamental current up to 600 A can be supplied in correspondence to, for instance, a 600 A rated current. However, if the motor current contains a higher harmonics current, the peak value of the motor current becomes higher than the peak value of the fundamental current, and accordingly, the fundamental current must be set lower than 600 A, i.e., the rated current. This presents a problem in that the efficiency becomes poor due to increases in the core loss and the copper loss as well as the reduced maximum motor torque. If a higher harmonics component is contained in the motor voltage, the peak value of the motor voltage becomes higher than the peak value of the fundamental voltage and, accordingly, the fundamental voltage must be set lower than the rated voltage of the motor and the power element. This poses a problem in that due to an insufficient voltage, a predetermined level of electrical current cannot be supplied to result in a reduced output.

An explanation is given first on the voltage ripple manifesting in a motor in which space harmonics are present. A circuit equation of the motor M may be expressed as follows.

$$vd = R \cdot id + d(\phi d)/dt - \omega e \cdot \phi q \quad (14)$$
$$= R \cdot id + d(\phi dm + Ld \cdot id)/dt - \omega e \cdot Lq \cdot iq,$$
$$vq = \omega e \cdot \phi d + R \cdot iq + d(\phi q)/dt$$
$$= \omega e(\phi dm + Ld \cdot id) + R \cdot iq + d(Lq \cdot iq)/dt$$

With vd representing the d-axis voltage, vq representing the q-axis voltage, R representing the phase winding resistance, Øa representing the d-axis armature flux linkage, Øq representing the q-axis armature flux linkage, Ødm representing the armature flux linkage (corresponding to the magnets), Ld representing the d-axis inductance and Lq representing the q-axis inductance.

By rewriting expression (14) with each of the individual magnetic fluxes, inductances and currents as the sum of a fundamental wave component and a higher harmonics component, the d-axis voltage vd is expressed as follows.

$$Vd = R(id\_1 + id\_h) + \quad (15)$$
$$d\{(\phi dm\_1 + \phi dm\_h) + (Ld\_1 + Ld\_h)(id\_1 + id\_h)\}/dt -$$
$$\omega e(Lq\_1 + Lq\_h)(iq\_1 + iq\_h)$$
$$= R(id\_1 + id\_h) +$$
$$d\{(\phi dm\_1 + Ld\_1 \cdot id\_1) + (\phi dm\_h + Ld\_h \cdot id\_1 + Ld\_1 \cdot$$
$$id\_h + Ld\_h \cdot id\_h)\}/dt -$$
$$\omega e(Lq\_1 \cdot iq\_1 + Lq\_h \cdot iq\_1 + Lq\_1 \cdot iq\_h + Lq\_h \cdot iq\_h)$$
$$= \{R \cdot id\_1 + d(\phi dm\_1 + Ld\_1 \cdot id\_1)/dt + \omega e \cdot Lq\_1 \cdot iq\_1\} +$$
$$[R \cdot id\_h + d(\phi dm\_h + Ld\_h \cdot id\_1 + Ld\_1 \cdot id\_h + Ld\_h \cdot id\_h)/$$
$$dt - \omega e(Lq\_h \cdot iq\_1 + Lq\_1 \cdot iq\_h + Lq\_h \cdot iq\_h)]$$

In expression (15), the first term represents the fundamental wave component and the second term represents the voltage ripple component. The voltage ripple may be eliminated by ensuring that the value of the second term is 0. In other words, the relationship expressed in the following expression (16) must be achieved.

$$R \cdot id\_h + d(\phi dm\_h + Ld \cdot h \cdot id\_1 + Ld\_1 \cdot id\_h + Ld \cdot h \cdot id\_h)/dt - \omega e(Lq\_h \cdot iq\_1 + Lq\_1 \cdot iq\_h + Lq\_h \cdot iq\_h) = 0 \quad (16)$$

In order to achieve the relationship expressed in expression (16), it must be ensured that the values of all three terms in expression (16) are 0. However, since the value of the first term is normally insignificant compared to the values of the second term and the third term and can be disregarded, the condition for setting the values of the second term and the third term to 0 is ascertained. The condition for setting the value of the second term to 0 is expressed in the following expression (17).

$$\phi dm\_h + Ld\_h \cdot id\_1 + (Ld\_1 + Ld\_h) \cdot id\_h = \text{constant value} \therefore id\_h = \quad (17)$$
$$-\{(\phi dm\_h + Ld\_h \cdot id\_1) + \text{constant value}\}/(Ld\_1 + Ld\_h)$$

The condition for setting the value of the third term to 0 is expressed in the following expression (18).

$$Lq\_h \cdot iq\_1 + Lq\_1 \cdot iq\_h + Lq\_h \cdot iq\_h = 0 \quad (18)$$

The ripple in the d-axis voltage vd may be eliminated by implementing control so as to set the higher harmonics components id_h in the d-axis current and iq_h in the q-axis current to the values expressed in expressions (17) and (18) respectively.

By rewriting expression (14) with each of the individual magnetic fluxes, inductances and currents as the sum of a fundamental wave component and a higher harmonics component, the q-axis voltage vq is expressed as in the following expression (19).

$$Vq = \omega e\{\phi dm\_1 + \phi dm\_h + (Ld\_1 + Ld\_h)(id\_1 + id\_h)\} + \quad (19)$$
$$R(iq\_1 + iq\_h) + d(Lq\_1 + Lq\_h)(iq\_1 + iq\_h)/dt =$$
$$\{\omega e(\phi dm\_1 + Ld\_1 \cdot id\_1) + R \cdot iq\_1 + d(Lq\_1 \cdot iq\_1)/dt\} + [$$
$$\omega e\{\phi dm\_h + (Ld\_h \cdot id\_1 + Ld\_1 \cdot id\_h + Ld\_h \cdot id\_h)\} +$$
$$R \cdot iq\_h + d(Lq\_h \cdot iq\_1 + Lq\_1 \cdot iq\_h + Lq\_h \cdot iq\_h)/dt]$$

In expression (19), the first term represents the fundamental 5 wave component and the second term represents the higher order component (corresponding to the ripple). The ripple in the q-axis voltage may be eliminated by ensuring that the value of the second term is 0. In other words, the relationship expressed in the following expression (20) must be achieved.

$$\omega e\{\phi dm\_h + (Ld\_h \cdot id\_1 + Ld\_1 \cdot id\_h + Ld\_h \cdot id\_h)\} + R \cdot iq\_h + d(Lq\_h \cdot iq\_1 + Lq\_1 \cdot iq\_h + Lq\_h \cdot iq\_h)/dt = 0 \quad (20)$$

In order to achieve the relationship expressed in expression (20), it must be ensured that the values in all three terms in expression (20) are 0. However, since the value of the second term is normally insignificant enough to be disregarded compared to the values of the first term and the third term, the condition for setting the values of the first term and the third term to 0 is ascertained. The condition for setting the value of the first term to 0 is expressed as in the following expression (21).

$$\emptyset dm\_h + (Ld\_h \cdot id\_1 + Ld\_1 id\_h + Ld\_h \cdot id\_h) = 0$$

$$\therefore id\_h = -(\emptyset dm\_h + Ld\_h \cdot id\_1)/(Ld\_1 + Ld\_h) \quad (21)$$

The condition for setting the value of the third term to 0 is expressed in the following expression (22).

$$Lq\_h \cdot iq\_1 + Lq\_1 \cdot iq\_h + Lq\_h \cdot iq\_h = \text{constant value}$$

$$\therefore iq\_h = (-Lq\_h \cdot iq\_1 + \text{constant value})/(Lq\_1 + Lq\_h) \quad (22)$$

The ripple in the q-axis voltage vq may be eliminated by implementing control so as to set the higher harmonics components id_h in the d-axis current and iq_h in the q-axis current to the values expressed in expressions (21) and (22) respectively.

It is to be noted that if the constant values in expressions (17) and (22) are 0, expressions (17) and (18) are identical to expressions (21) and (22) respectively. In other words, since the condition for setting the ripple voltage in the d-axis voltage vd can be the same as the condition for setting the ripple voltage in the q-axis voltage vq, it becomes possible to set the ripple components in both the d-axis voltage vd and the q-axis voltage vq under a single condition.

$$id\_h = -(\emptyset dm\_h + Ld\_h \cdot id\_1)/Ld\_1,$$

$$iq\_h = -Lq\_h \cdot iq\_1/Lq\_1 \quad (23)$$

Namely, by implementing control so as to set the d-axis higher harmonics current id_h and the q-axis higher harmonics current iq_h in the fundamental coordinate system dq to the values indicated in expression (23), the voltage ripple can be reduced. It is to be noted that the higher harmonics currents id_h and iq_h in the fundamental coordinate system dq can be converted to a dh-axis higher harmonics current idh and a qh-axis higher harmonics current iqh in the higher harmonics coordinate system dhqh through expression (1). Thus, by incorporating expression (23) into expression (1) to calculate a dh-axis current command value idh* and a qh-axis current command value iqh* and implementing control on the higher harmonics currents accordingly as explained earlier, the voltage ripple can be minimized.

Figure 8:
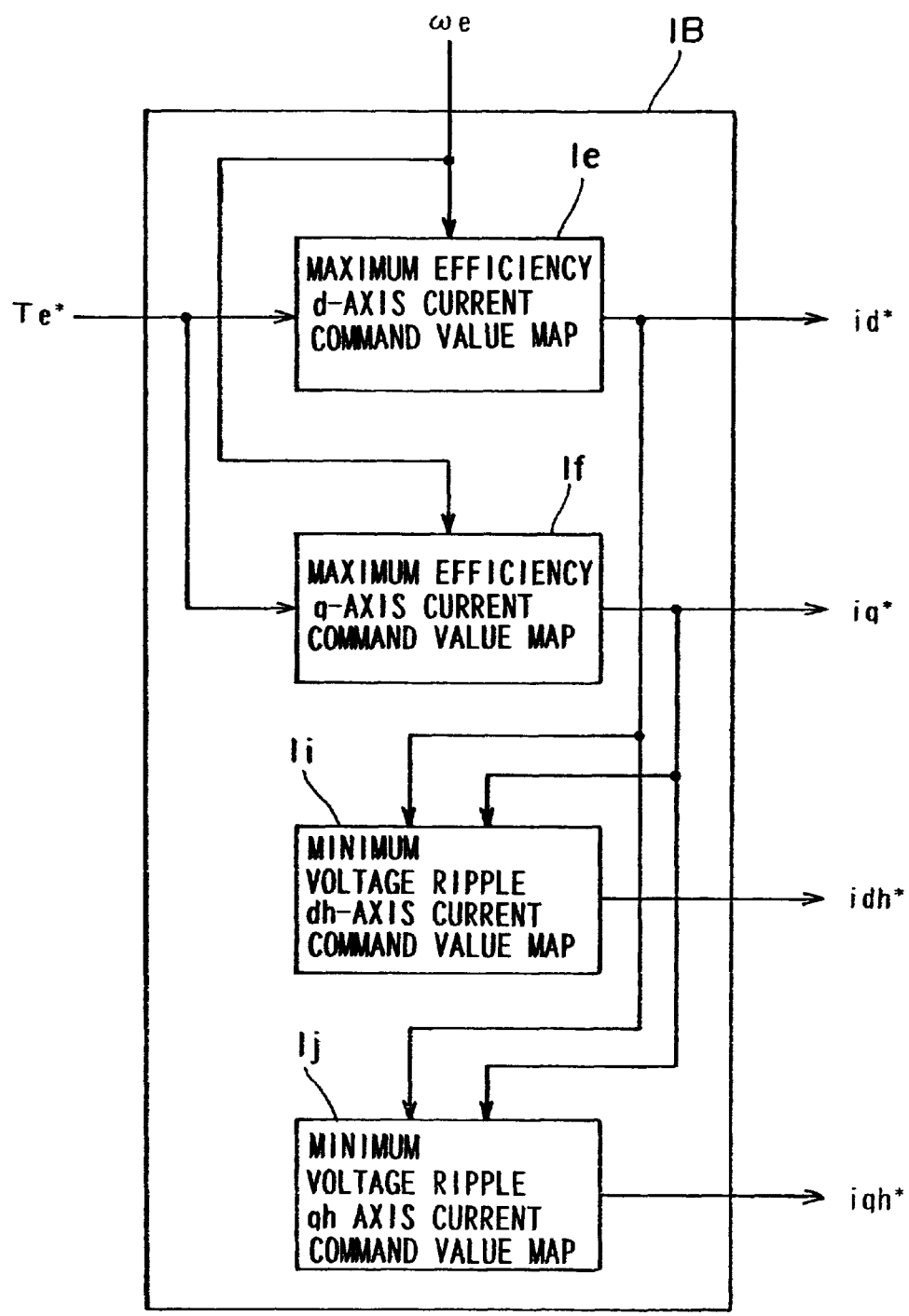
FIG. 8 shows in detail the structure adopted in the torque control unit in the motor control apparatus in a third embodiment.

FIG. 8 shows in detail the structure adopted in a torque control unit 1B in the third embodiment. In the motor control apparatus in the third embodiment, the torque control unit 1B is employed instead of the torque control unit 1 shown in FIG. 1. The torque control unit 1B calculates a d-axis current command value id* corresponding to the torque command value Te* and the motor rotating speed ωe by looking up a maximum efficiency id map 1e. In the maximum efficiency id map 1e, d-axis current command value data relative to the torque command value Te* and the motor rotating speed ωe are stored. In addition, the torque control unit 1B calculates a q-axis current command value iq* corresponding to the torque command value Te* and the motor rotating speed ωe by looking up a maximum efficiency iq map 1f. In the maximum efficiency iq map 1f, q-axis current command value data relative to the torque command value and the motor rotating speed are stored.

The torque control unit 1B also calculates a dh-axis current command value idh* corresponding to a d-axis current command value id* and a q-axis current command value iq* by looking up a minimum voltage ripple idh map 1i. In the minimum voltage ripple idh map 1i, dh-axis current command value data relative to the d-axis current command value and the q-axis current command value are stored. Likewise, the torque control unit 1B calculates a qh-axis current command value iqh* corresponding to the d-axis current command value id* and the q-axis current command value iq* by looking up a minimum voltage ripple iqh map 1j. In the minimum voltage ripple iqh map 1j, qh-axis current command value data relative to the d-axis and q-axis current command values are stored.

In the maps 1e, 1f, 1i and 1j, the fundamental current command values and the higher harmonics current command values that minimize the voltage ripple among combinations of current command values for matching the motor torque Te to the torque command value Te* are stored. Since an error occurs if these command values are ascertained through an arithmetic operation, data of measured values obtained by measuring the fundamental currents and the higher harmonics currents that achieve minimum voltage ripple in advance may be used.

In the motor control apparatus in the third embodiment, the torque Te that matches the torque command value Te* can be output from the motor while minimizing the voltage ripple at any motor rotating speed ωe. As a result, the extent to which the fundamental voltage becomes reduced is minimized to achieve an increase in the motor output.

(Fourth Embodiment)

The motor control apparatus achieved in the fourth embodiment minimizes the current ripple. It is to be noted that since the motor control apparatus in the fourth embodiment assumes a structure identical to the structure of the motor control apparatus in the first embodiment illustrated in FIG. 1 except for the structure adopted in the torque control unit 1, an explanation of the overall structure is omitted and the following explanation focuses on the difference.

Figure 9:
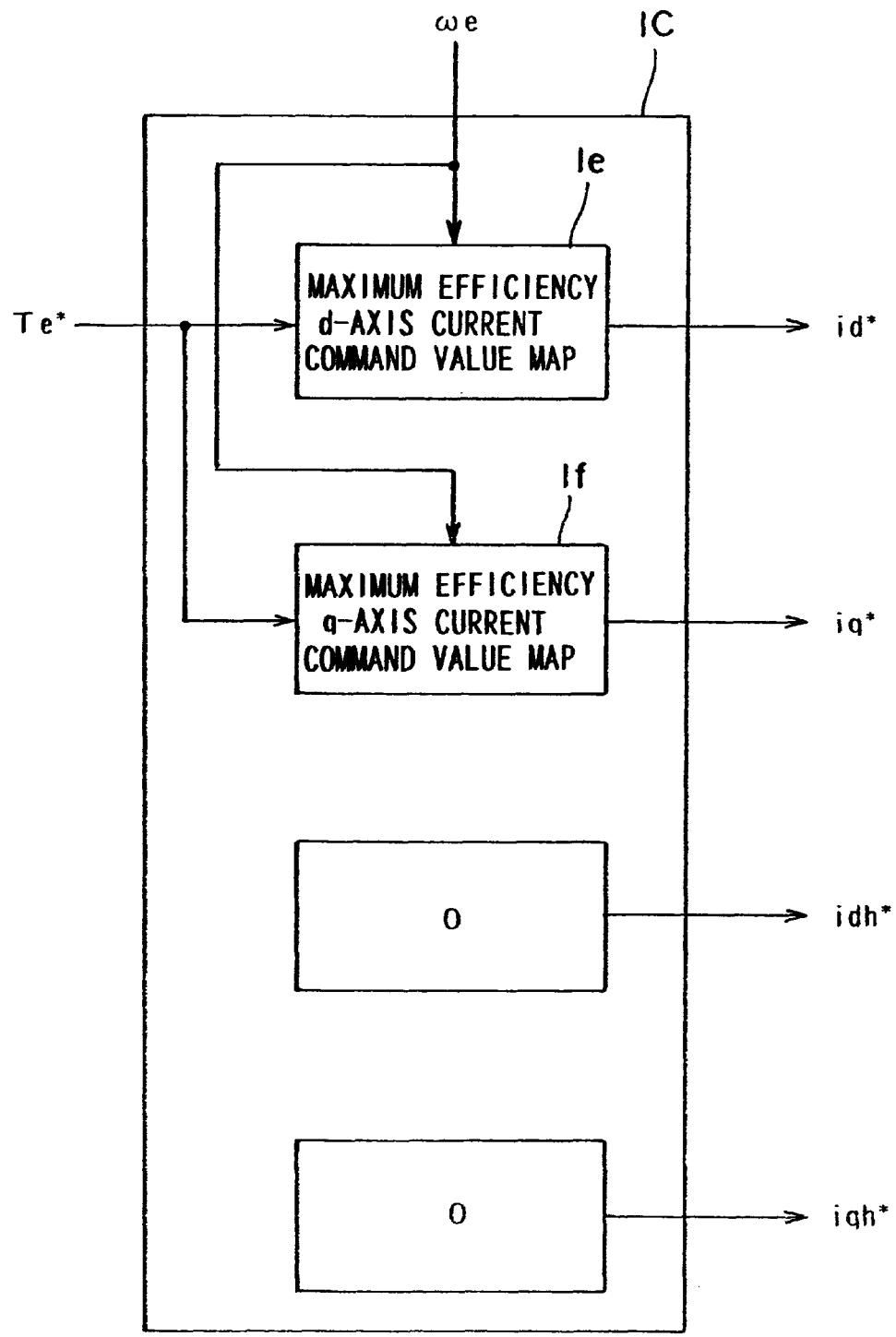
FIG. 9 shows in detail the structure adopted in the torque control unit in the motor control apparatus in a fourth embodiment.

FIG. 9 shows in detail the structure adopted in a torque control unit 1C in the fourth embodiment. In the motor control apparatus in the fourth embodiment, the torque control unit 1C is employed instead of the torque control unit shown in FIG. 1. The torque control unit 1C calculates a d-axis current command value id* corresponding to the torque command value Te* and the motor rotating speed ωe by looking up a maximum efficiency id map 1e. In the maximum efficiency id map 1e, d-axis current command value data relative to the torque command value Te* and the motor rotating speed ωe are stored. In addition, the torque control unit 1C calculates a q-axis current co mand value iq* corresponding to the torque command value Te* and the motor rotating speed ωe by looking up a maximum efficiency iq map 1f. In the maximum efficiency iq map 1f, q-axis current command value data relative to the torque command value Te and the motor rotating speed ωe are stored.

The torque control unit 1C sets both the dh-axis current command value idh* and the qh-axis current command value iqh* to 0. This enables control for setting both the dh-axis current idh and the qh-axis current iqh in the higher harmonics coordinate system dhqh to 0.

In the motor control apparatus in the fourth embodiment, the torque Te that matches the torque command value Te* can be output from the motor while minimizing the current ripple at any motor rotating speed ωe. In addition, since the extent to which the fundamental current is lowered can be minimized by suppressing the current ripple, an increase in the motor torque is achieved in the constant torque control range.

(Fifth Embodiment)

An explanation is given on the fifth embodiment in which optimal fundamental current command values and optimal higher harmonics current command values are selected in correspondence to the operating state of the motor M. It is to be noted that since the motor control apparatus in the fifth embodiment assumes a structure identical to the structure of the motor control apparatus in the first embodiment shown in FIG. 1 except for the structure adopted in the torque control unit 1, an explanation of the overall structure is omitted and the following explanation focuses on the difference.

Figure 10:
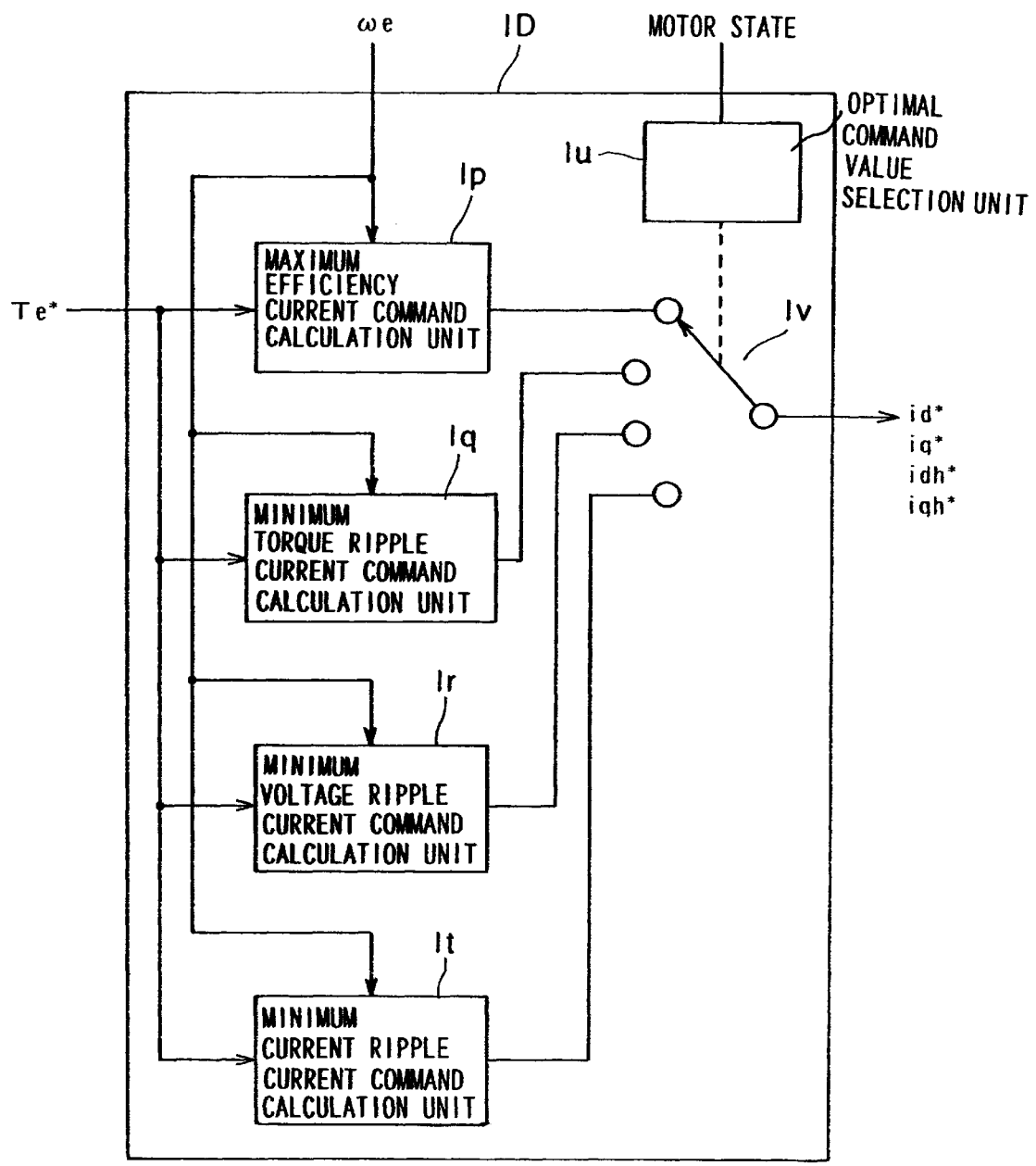
FIG. 10 shows in detail the structure adopted in the torque control unit in the motor control apparatus in a fifth embodiment.

FIG. 10 shows in detail the structure adopted in a torque control unit 1D in the fifth embodiment. In the motor control apparatus in the fifth embodiment, the torque control unit 1D is employed instead of the torque control unit 1 shown in FIG. 1. The torque control unit 1D is provided with a maximum efficiency current command calculation unit 1p, a minimum torque ripple current command calculation unit 1g, a minimum voltage ripple current command calculation unit 1r, a minimum current ripple current command calculation unit 1t, an optimal command value selection unit 1u and a selector switch 1v.

The maximum efficiency current command calculation unit 1p calculates fundamental current command values id* and iq* and higher harmonics current command values idh* and iqh* that maximize the efficiency. The minimum torque ripple current command calculation unit 1g calculates fundamental current command values id* and iq* and higher harmonics current command values idh* and iqh* that minimize the torque ripple. The minimum voltage ripple current command calculation unit 1r calculates fundamental current command values id* and iq* and higher harmonics current command values idh* and iqh* that minimizes the voltage ripple. The minimum current ripple current command calculation unit 1t calculates fundamental current command values id* and iq* and higher harmonics current command values idh* and iqh* that minimizes the current ripple.

The optimal command value selection unit 1u selects the optimal current command values from the current command values calculated at the current command calculation units 1p, 1q, 1r and 1t, in correspondence to the operating state of the motor M which includes the rotating speed ωe and the torque Te of the motor M, and switches the selector switch 1v. It is to be noted that the torque Te of the motor M may be calculated through expression (3) or expression (6) mentioned earlier, for instance, or it may be measured by providing a torque detector.

Figure 11:
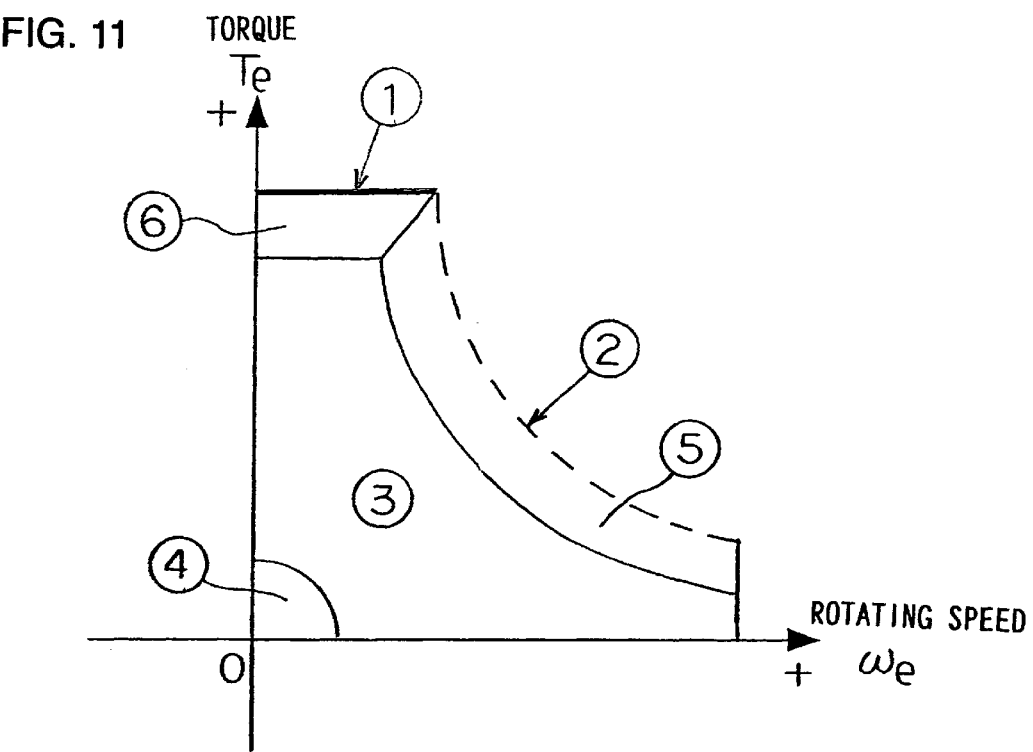
FIG. 11 is a diagram provided to facilitate an explanation of the operation performed to select the optimal current command value corresponding to a given motor operating state.

In reference to FIG. 11 the operation of the optimal command value selection unit 1u is explained. FIG. 11 shows the first quadrant in FIG. 7 showing the output characteristics of the motor M. Since the operation achieved in the second~fourth quadrants is identical to the operation achieved over the first quadrant, an explanation thereof is omitted.

In the range ⑥ in the vicinity of the maximum torque line ① in FIG. 11, a higher motor current is achieved compared to the motor current levels in the other ranges ③~②, and the motor current becomes close to the rated current of the power element of the power conversion unit 10 in the range ⑥. When the operating point of the motor, which is determined by the rotating speed ωe and the torque Te of the motor M is within the range ⑥, i.e., when the difference between the motor torque Te and the maximum torque is equal to or less than a predetermined value and the motor torque Te is close to the maximum value, the current command values calculated at the minimum current ripple current command calculation unit 1t are selected. As a result, the current ripple at the motor M is minimized to achieve a motor current peak value which is lower than the rated current of the power element.

Since a higher voltage must be applied to the motor M as explained earlier in the range ⑤ in the vicinity of the maximum output line ②, the differences between the DC bus voltage (the invertor DC link voltage) and the motor voltages vu, vv and vw become reduced. Accordingly, when the operating point determined by the rotating speed ωe and the torque Te of the motor M is within the range ⑤, i.e., when the difference between the motor output and the maximum output is equal to or less than a predetermined value and the motor output is close to the maximum value, the current command values calculated at the minimum voltage ripple current command calculation unit 1r are selected. As a result, the voltage ripple at the motor M is minimized to make it possible to prevent reductions in the motor voltages caused by ripple voltage while ensuring that the motor voltage peak value is lower than the voltage at the power element.

Since the effect of the torque ripple manifests to a greater extent in the range ④ over which the rotating speed ωe and the torque Te of the motor M are both low, the current command values calculated at the minimum torque ripple current command calculation unit 1g are selected. This minimizes the torque ripple at the motor M, which makes it possible to reduce discomfort to the passengers by lowering the extent of adverse effects attributable to the torque ripple such as vibration and noise in an electric car.

When the operating point determined by the rotating speed ωe and the torque Te of the motor M is within the range ③, the current command values calculated at the maximum efficiency current command calculation unit 1p for achieving the maximum efficiency are selected. This enables a reduction in the power consumption at the motor M while maximizing the efficiency of the motor M.

In the motor control apparatus in the fifth embodiment, drive control is implemented on the motor M by selecting the optimal current command values corresponding to the operating state of the motor M.

It is to be noted that in the motor control apparatuses achieved in the individual embodiments described above, the d-axis fundamental current command value id* and the q-axis fundamental current command value iq* and the dh-axis higher harmonics current command value idh* and the qh-axis higher harmonics current command value iqh* are calculated at the torque control unit 1, 1A, 1B and 1C based upon the torque command value Te* and the motor rotating speed ωe. However, if the motor M is to be driven over the rotating speed (ωe) range of 0~base rotating speed ωb shown in FIG. 7, i.e., if the motor M is to be operated only within the constant torque control range (constant torque control), the d-axis fundamental current command value id* and the q-axis fundamental current command value iq* and the dh-axis higher harmonics current command value idh* and the qh-axis higher harmonics current command value iqh* should be calculated based upon the torque command value Te* alone. In other words, by providing a map of current command value data relative to the torque command value Te* in advance, the current command values id*, iq*, idh* and iqh* corresponding to a specific torque command value Te* should be calculated by looking up the map.

(Sixth Embodiment)

In the motor control apparatus in the fourth embodiment, the dh-axis current command value idh* (=0) and the qh-axis current command value iqh* (=0) as well as the current command values id* and iq* are calculated by looking up maps in correspondence to the torque command value Te* and the motor rotating speed ωe. In the motor control apparatus in the sixth embodiment, a higher harmonics current control unit 11A implements control on the higher harmonics currents so as to reduce the higher harmonics components of the specific order as explained earlier among higher harmonics components contained in the motor currents iu, iv and iw. Namely, it sets both the dh-axis current command value idh* and the qh-axis current command value iqh* to 0.

Figure 12:
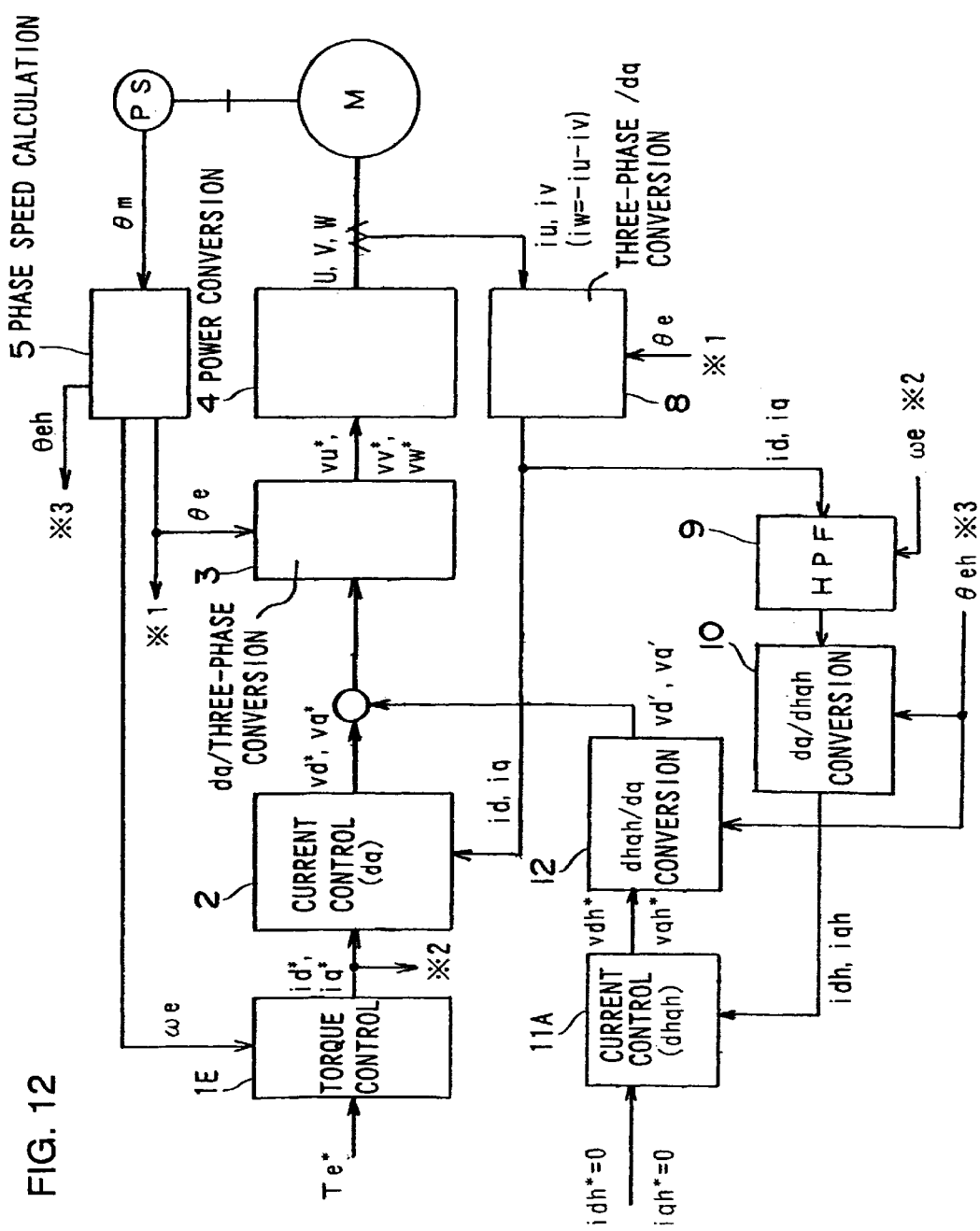
FIG. 12 shows the structure adopted in the motor control apparatus in a sixth embodiment.

FIG. 12 shows the structure adopted in the motor control apparatus in the sixth embodiment. The structural differences from the motor control apparatus in the first embodiment illustrated in FIG. 1 are in a torque control unit 1E and the higher harmonics current control unit 11A. As explained above, the higher harmonics current control unit 11A implements control on the higher harmonics currents so as to ensure that the higher harmonics components of the specific order are 0 at all times. The torque control unit 1E calculates current command values id* and iq* by looking up current command value tables based upon the torque command value Te* and the motor rotating speed ωe. The current command values id* and iq* may be selected so as to maximize the motor efficiency as in the fourth embodiment or appropriate current command values id* and iq* may be selected from another viewpoint.

Figure 13A:
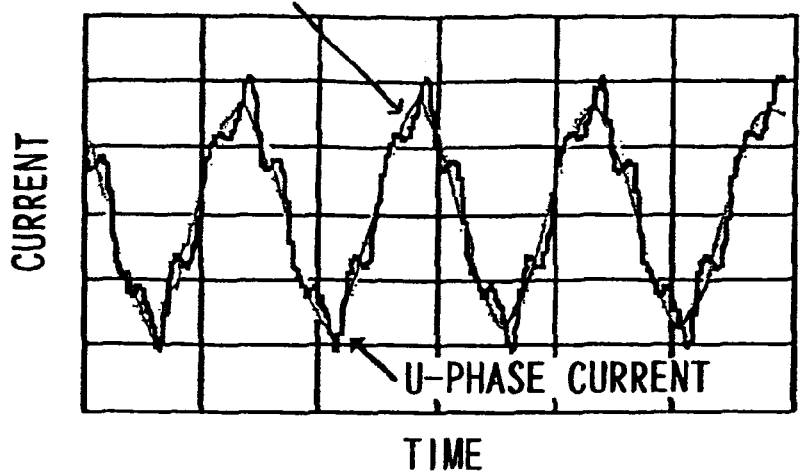
FIG. 13A presents a diagram of the current waveform manifesting in a motor driven by a motor control apparatus in the related art.
Figure 13B:
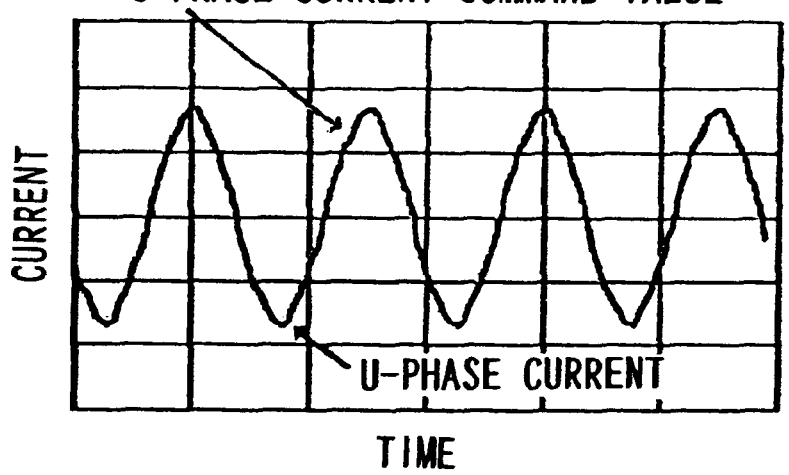
FIG. 13B presents a diagram of the current waveform manifesting in a motor driven by the motor control apparatus in the sixth embodiment.

FIG. 13A shows the waveform of the U-phase current relative to the U-phase current command value, which manifests when a concentrated winding IPM motor, in which a significant space harmonic component is present is driven by employing a motor control apparatus that implements motor control using the dq coordinate system alone. FIG. 13B shows the waveform of the U-phase current relative to the U-phase current command value manifesting when the same IPM motor is driven by employing the motor control apparatus in the sixth embodiment. As FIG. 13A clearly indicates, a very significant higher harmonics component is contained in the motor current when motor control is implemented by using the dq coordinate system alone. In contrast, when the motor control apparatus in the sixth embodiment is utilized, the higher harmonics component is greatly reduced as shown in FIG. 13B.

By adopting the motor control apparatus in the sixth embodiment, the higher harmonics currents contained in the motor currents iu, iv and iw and in particular, the higher harmonics components of the kth order and its vicinity, can be greatly reduced.

(Seventh Embodiment)

In the first embodiment explained earlier, the ultimate d-axis voltage command value (vd*+vd') and q-axis voltage command value (vq*+vq') are obtained by adding the d-axis voltage command value vd' and the q-axis voltage command value vq' corresponding to the higher harmonics components to the d-axis voltage command value vd* and the q-axis voltage command value vq* corresponding to the fundamental wave components respectively, and then, the d-axis and q-axis voltage command values are converted to three-phase voltage command values vu*, vv* and vw* through dq/three-phase conversion. In the seventh embodiment, on the other hand, three-phase AC voltage command values vu*, vv* and vw* corresponding to the fundamental wave components and three-phase AC voltage command values vu', vv' and vw' corresponding to the higher harmonics components are ascertained and then they are respectively added together to calculate ultimate three-phase AC voltage command values (vu*+vu'), (vv*+vv') and (vw*+vw').

Figure 14:
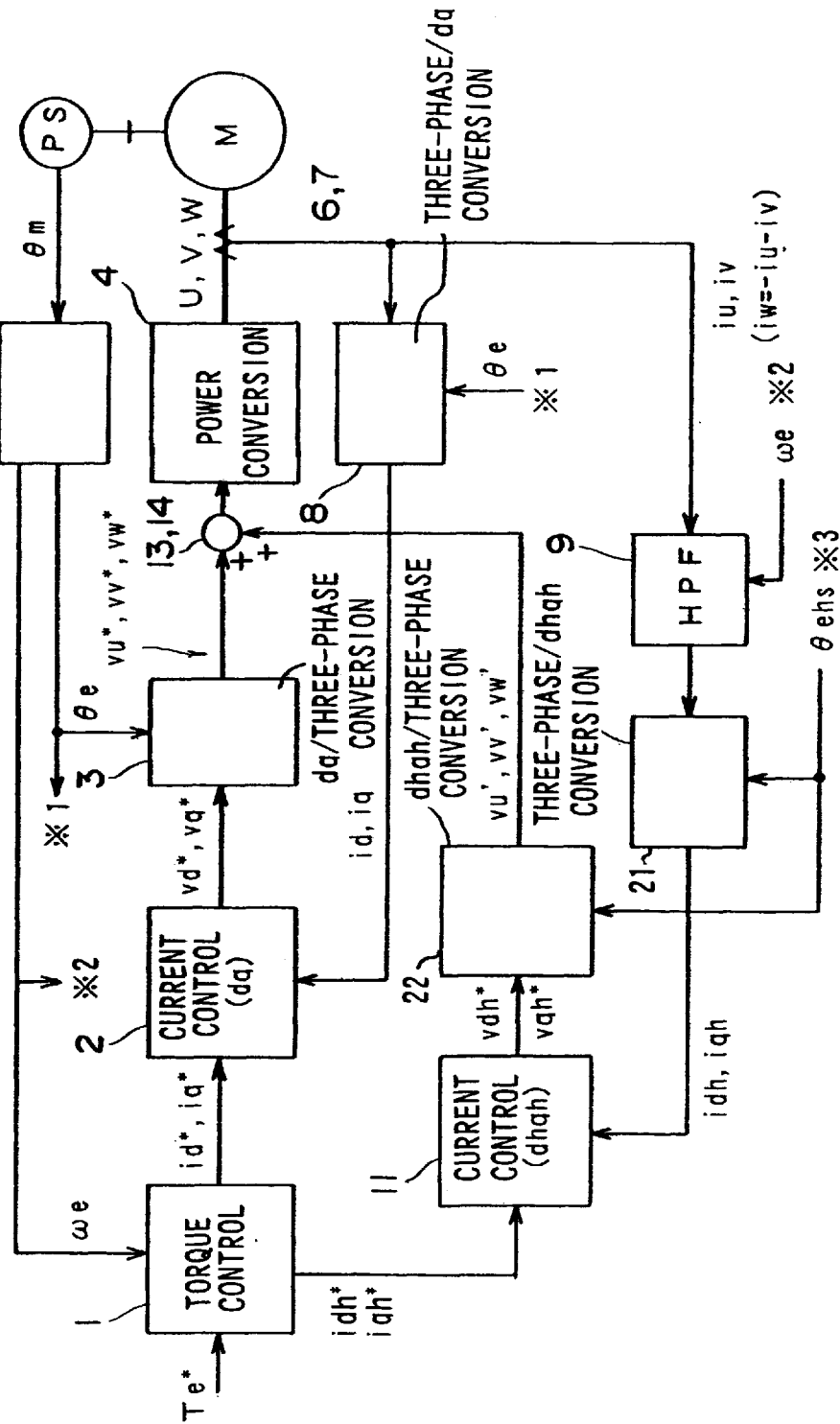
FIG. 14 shows the structure adopted in the motor control apparatus in a seventh embodiment.

FIG. 14 shows the structure adopted in the motor control apparatus in the seventh embodiment. It is to be noted that the same reference numerals are assigned to devices identical to those shown in FIG. 1 to preclude the necessity for a repeated explanation thereof and that those devices are shown in single-line delineation. Since the fundamental current control circuit is similar to that in the first embodiment shown in FIG. 1, its explanation is omitted.

In the higher harmonics current control circuit, the high pass filter 9 extracts higher harmonics components by implementing filtering on the actual currents iu and iv at the three-phase alternating current motor M. A three-phase-dhqh conversion unit 21 includes a higher harmonics coordinate system dhqh and converts the higher harmonics components in the motor currents iu and iv to actual currents idh and iqh in the higher harmonics coordinate system dhqh. The higher harmonics coordinate system in this context refers to an orthogonal coordinate system that rotates at the frequency of a higher harmonics component of a specific order manifesting when the motor currents iu, iv and iw are controlled by the fundamental current control circuit alone, as explained earlier. The actual current idh and iqh in the dhqh coordinate system are ascertained through the following formula (24), in which θehs represents the phase of the dhqh coordinate system viewed from the three-phase coordinate system.

$$\begin{bmatrix} idh \\ iqh \end{bmatrix} = \sqrt{2} \begin{bmatrix} \cos\theta ehs & \sin\theta ehs \\ -\sin\theta ehs & \cos\theta ehs \end{bmatrix} \begin{bmatrix} \sin\left(\theta e + \frac{\pi}{3}\right) & \sin\theta e \\ \cos\left(\theta e + \frac{\pi}{3}\right) & \cos\theta e \end{bmatrix} \begin{bmatrix} iu \\ iv \end{bmatrix} \quad (24)$$

A dhqh/three-phase conversion unit 22 converts a voltage command value vdh* along the dh-axis and a voltage command value vqh* corresponding to the qh-axis provided by the higher harmonics current control unit 11 to three-phase AC voltage command values vu', vv' and vw' corresponding to the higher harmonics components. This conversion may be achieved by reversing the conversion of formula (24). The adders 13 and 14 add the three-phase AC voltage command values vu*, vv* and vw* corresponding to the fundamental wave components calculated at the fundamental current control circuit to the three-phase AC voltage command values vu', vv' and vw' corresponding to the higher harmonics components calculated at the higher harmonics current control circuit and obtain the ultimate three-phase command values (vu*+vu'), (vv*+vv') and (vw*+vw').

Advantages achieved by utilizing the motor control apparatus in the seventh embodiment are identical to those realized when the motor control apparatus in the first embodiment is employed. It is to be noted that since the command values corresponding to the fundamental wave components and the higher harmonics components are calculated in the three-phase AC coordinate system in the motor control apparatus in the seventh embodiment, the volume of the arithmetic processing increases compared to the processing volume in the first embodiment, in which the arithmetic operation is performed in the dq coordinate system.

(Eighth Embodiment)

As explained above, in the first embodiment, the voltage command values are calculated in the dq coordinate system and in the seventh embodiment, the voltage command values are calculated in the three-phase AC coordinate system. In the eighth embodiment, the voltage command values are calculated in an αβ coordinate system.

The three-phase AC coordinate system mentioned earlier is a static coordinate system fixed to the motor stator, having axes that a U-phase, a V-phase and a W-phase which are sequentially offset from each other by 120°. The αβ coordinate system, on the other hand, is an orthogonal coordinate system fixed to the stator. Normally, the αβ coordinate system is set by assuming an α-axis at the phase which is the same as the phase of the U-axis in the three-phase AC coordinate system. Since the three physical quantities in the three-phase AC coordinate system can be handled as two physical quantities that are perpendicular to each other in the αβ coordinate system, the volume of processing required to calculate the command values is roughly equal to the volume of the processing required in the dq coordinate system in the first embodiment.

Figure 15:
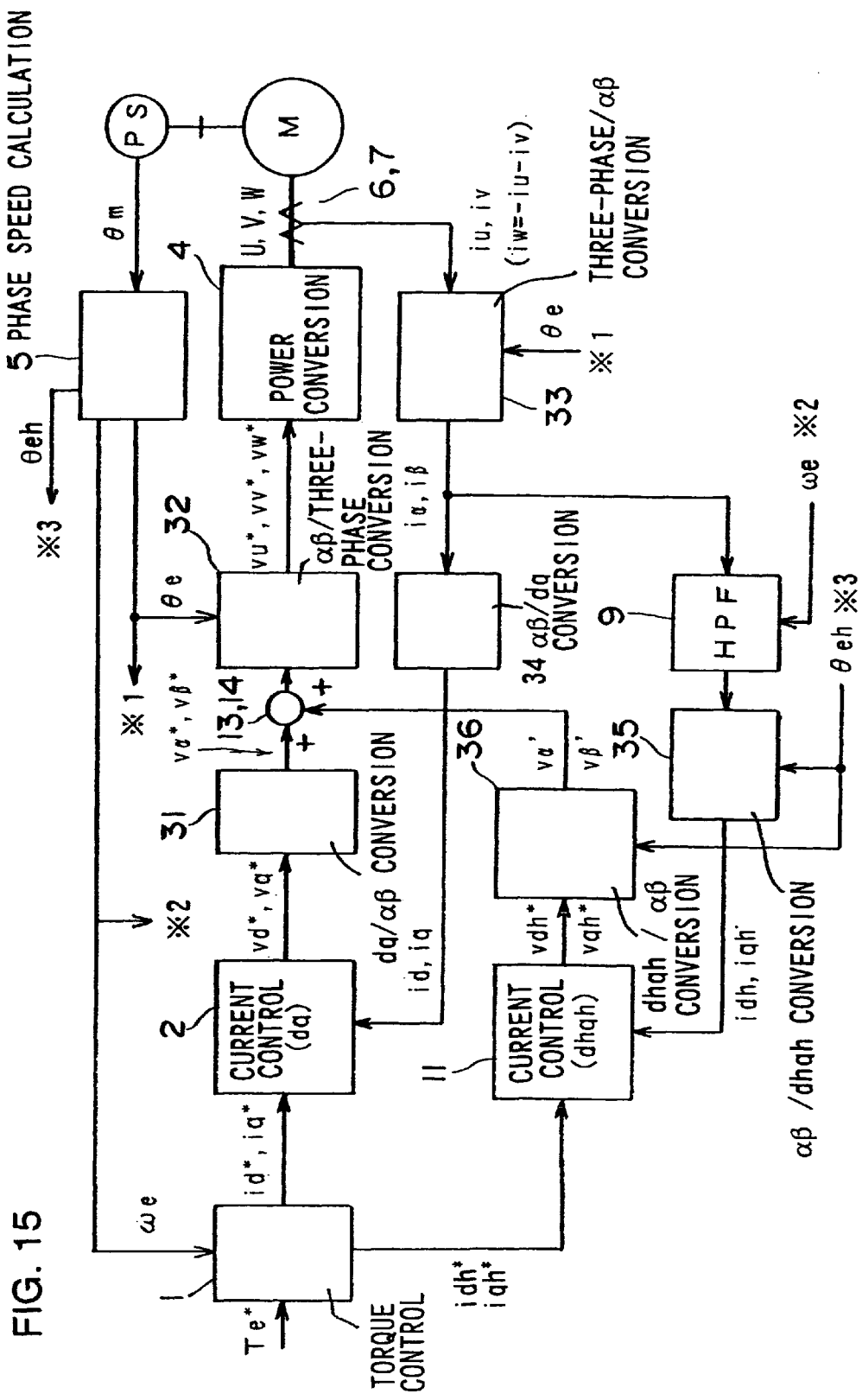
FIG. 15 shows the structure adopted in the motor control apparatus in an eighth embodiment.

FIG. 15 shows the structure adopted in the motor control apparatus in the eighth embodiment. It is to be noted that the same reference numerals are assigned to devices identical to those shown in FIG. 1 to preclude the necessity for a repeated explanation thereof and that such devices are shown in single-line delineation. The fundamental current control circuit in the seventh embodiment is achieved by adding a dq/αβ conversion unit 31 and an αβ/three-phase conversion unit 32 to the fundamental current control circuit in FIG. 1 and replacing the three-phase/dq conversion unit 8 in FIG. 1 with a three-phase/αβ conversion unit 33 and an αβ/dq conversion unit 34.

The dq/αβ conversion unit 31 converts fundamental voltage command values vd* and vq* corresponding to the d-axis and the q-axis respectively calculated at the fundamental current control unit 2 to fundamental voltage command values vα* and vβ* corresponding to the α-axis and the β-axis respectively. The αβ/three-phase conversion unit 32 converts ultimate voltage command values (vα*+vα') and (vβ*+vi') corresponding to the a-axis and the β-axis to be detailed later to three-phase voltage command values vu*, vv* and vw*. The three-phase/αβ conversion unit 33 converts the actual currents iu, iv and iw (=−iu−iv) at the three-phase alternating current motor M to actual currents iα and iβ along the α-axis and the β-axis based upon the fundamental current phase θe. The αβ/dq conversion unit 34 converts the actual currents iα and iβ along the α-axis and the β-axis to actual currents id and iq along the d-axis and the q-axis.

In the higher harmonics current control circuit in the eighth embodiment, an αβ/dhqh conversion unit 35 and a dhqh/αβ conversion unit 36 are utilized instead of the dq/dhqh conversion unit 10 and the dhqh/dq conversion unit 12 in the higher harmonics current control circuit shown in FIG. 1.

The high pass filter 9 extracts the higher harmonics components by filtering the actual currents iα and iβ along the α-axis and the β-axis. The extracted higher harmonics components are provided to the αβ/dhqh conversion unit 35. The αβ/dhqh conversion unit 35, which includes a higher harmonics coordinate system dhqh converts the higher harmonics components of the α-axis current iα and the β-axis current iβ to actual currents idh and iqh in a higher harmonics coordinate system dhqh. As explained earlier, the higher harmonics coordinate system is an orthogonal coordinate system that rotates at the frequency of the higher harmonics component of a specific order manifesting when the motor currents iu, iv and iw are controlled through the fundamental current control circuit alone. The dhqh/αβ conversion unit 36 converts higher harmonics voltage command values vdh* and vqh* along the dh-axis and the qh-axis provided from the higher harmonics current control unit 11 to higher harmonics voltage command values vα' and vβ' along the α-axis and the β-axis.

The adders 13 and 14 add fundamental voltage command values vα* and vβ* along the α-axis and the β-axis calculated at the fundamental current control circuit to higher harmonics voltage command values vα' and vβ' along the a-axis and the β-axis calculated at the higher harmonics current control circuit to calculate ultimate voltage command values (vα*+vα') and (vβ*+vβ') along the α-axis and the β-axis.

The ultimate voltage command values (vα*+vα') and (vβ*+vβ') along the α-axis and the β-axis are converted to three-phase AC voltage command values vu*, vv* and vw* at the αβ/three-phase conversion unit 32. The power conversion unit 4 applies three-phase AC voltages U, V and W to the three-phase alternating current motor M in conformance to the three-phase AC voltage command values vu*, vv* and vw*.

The advantages achieved by utilizing the motor control apparatus in the eighth embodiment are identical to the advantages realized when the motor control apparatus in the first embodiment is employed.

(Ninth Embodiment)

In the sixth embodiment explained earlier, the higher harmonics component of a single order (the kth order) contained in a motor current is reduced. In the ninth embodiment, the current ripple is minimized by reducing higher harmonic components of two orders, i.e., mainly the higher harmonic components of the fifth order and the seventh order which are normally regarded as orders manifesting significant higher harmonics components.

Figure 16:
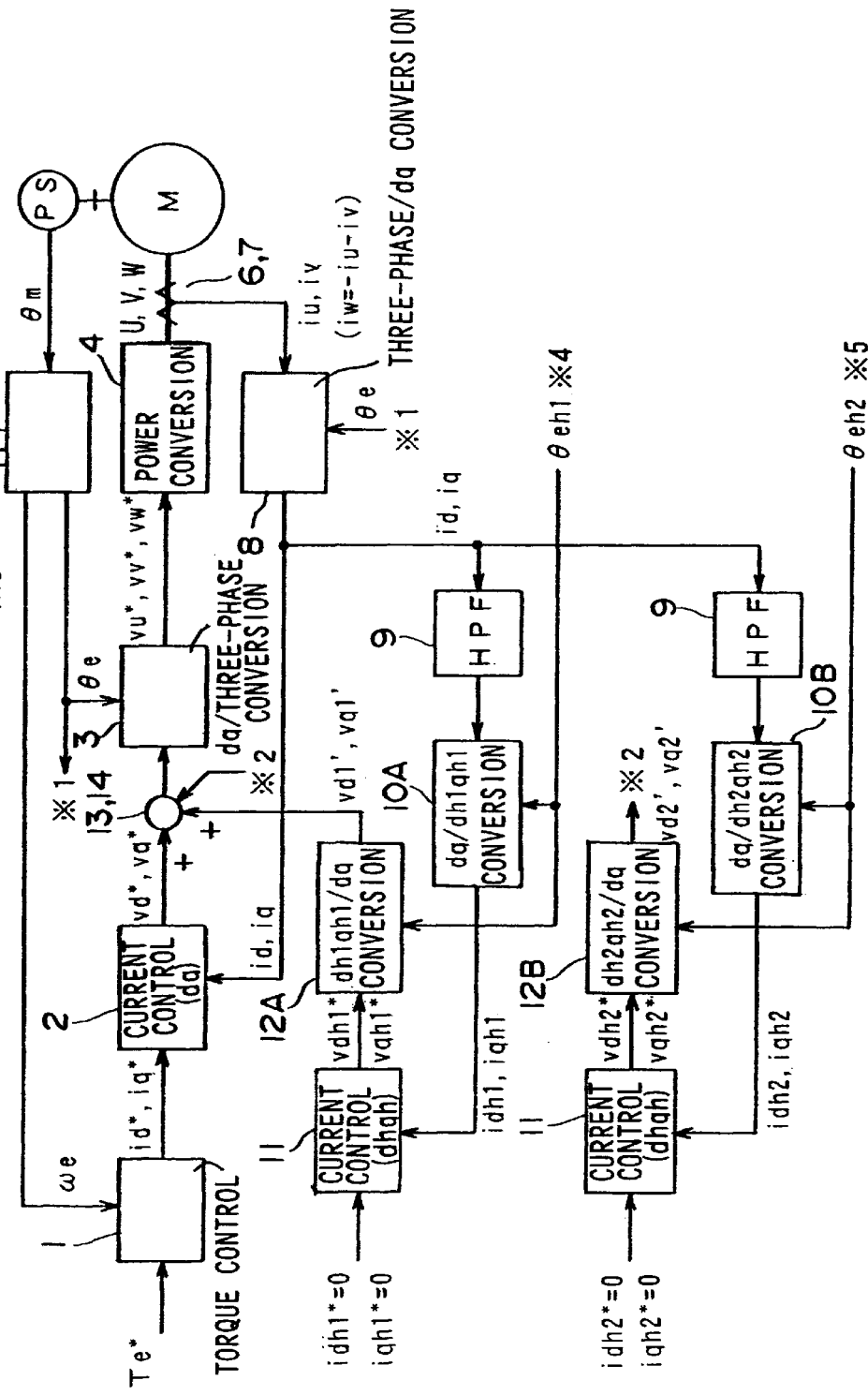
FIG. 16 shows the structure adopted in the motor control apparatus in a ninth embodiment.

FIG. 16 shows the structure adopted in the motor control apparatus in the ninth embodiment. It is to be noted that the same reference numerals are assigned to devices identical to those shown in FIG. 1 to preclude the necessity for a repeated explanation thereof and that such devices are shown in single-line delineation. The structure adopted in the fundamental current control circuit in the ninth embodiment is identical to the structure of the fundamental current control circuit in the sixth embodiment.

The motor control apparatus in the ninth embodiment differs from the motor control apparatus in the sixth embodiment in the structure adopted in its higher harmonics current control circuit. Namely, the motor control apparatus in the ninth embodiment is provided with two sets of the higher harmonics current control circuit utilized in the sixth embodiment. One of the higher harmonics current control circuit comprises a three-phase/dq conversion unit 8, a high pass filter 9, a dq/dh1qh1 conversion unit 10A, a higher harmonics current control unit 11 and a dh1qh1/dq conversion unit 12A. The other higher harmonics current control circuit comprises a three-phase/dq conversion unit 8, a high pass filter unit 9, a dq/dh2qh2 conversion unit 10B, a higher harmonics current control unit 11 and a dh2qh2/dq conversion unit 12B.

The dq/dh1gh1 conversion unit 10A and the dq/dh2qh2 conversion unit 10B are both identical to the dq/dhqh conversion unit 10 shown in FIG. 1. However, the dq/dh1qh1 conversion unit 10A converts the higher harmonics components of actual currents id and iq along the d-axis and q-axis to actual currents idh1 and iqh1 in an orthogonal coordinate system (higher harmonics coordinate system) dh1qh1 which rotates in synchronization with the phase θeh1 of the fifth-order higher harmonics components of the motor currents viewed from the dq coordinate system. In addition, the dq/dh2qh2 conversion unit 10B converts the higher harmonics components of the actual currents id and iq along the d-axis and q-axis to actual currents idh2 and iqh2 in an orthogonal coordinate system (higher harmonics coordinate system) dh2qh2 which rotates in synchronization the phase θeh2 of the seventh-order higher harmonics components of the motor currents viewed from the dq coordinate system.

The dh1qh1/dq conversion unit 12A and the dh2qh2/dq conversion unit 12B are both identical to the dhqh/dq conversion unit 12 in FIG. 1. However, the dh1qh1/dq conversion unit 12A converts higher harmonics voltage command values vdh1* and vqh1* along the dh1-axis and the qh1-axis to higher harmonics voltage command values vd1' and vq1' along the d-axis and the q-axis. In addition, the dh2qh2/dq conversion unit 12B converts higher harmonics voltage command values vdh2* and vqh2* along the dh2-axis and the qh2-axis to higher harmonics voltage command values vd2' and vq2' along the d-axis and the q-axis.

The adders 13 and 14 add fundamental voltage command values vd* and vq* along the d-axis and the q-axis calculated at the fundamental current control circuit, higher harmonics voltage command values vd1' and vq1' along the d-axis and the q-axis calculated at the fifth-order higher harmonics current control circuit and higher harmonics voltage command values vd2' and vq2' along the d-axis and the q-axis calculated at the seventh-order higher harmonics current control circuit respectively to calculate ultimate voltage command values (vd*+vd1'+vd2') and (vq*+vq1'+vq2') along the d-axis and the q-axis.

The ultimate voltage command values (vd*+vd1'+vd2') and (vq*+vq1'+vq2') along the d-axis and the q-axis are converted to three-phase AC voltage command values vu*, vv* and vw* at the dq/three-phase conversion unit 3. The power conversion unit 4 applies three-phase AC voltages U, V and W to the three-phase alternating current motor M in conformance to the three-phase AC voltage command values vu*, vv* and vw*.

In the motor control apparatus in the ninth embodiment, the higher harmonics components contained in the motor currents and, in particular, the higher harmonics components of the fifth order and the seventh order are reduced to an even further extent compared to the motor control apparatus in the sixth embodiment explained earlier.

(Tenth Embodiment)

Figure 17:
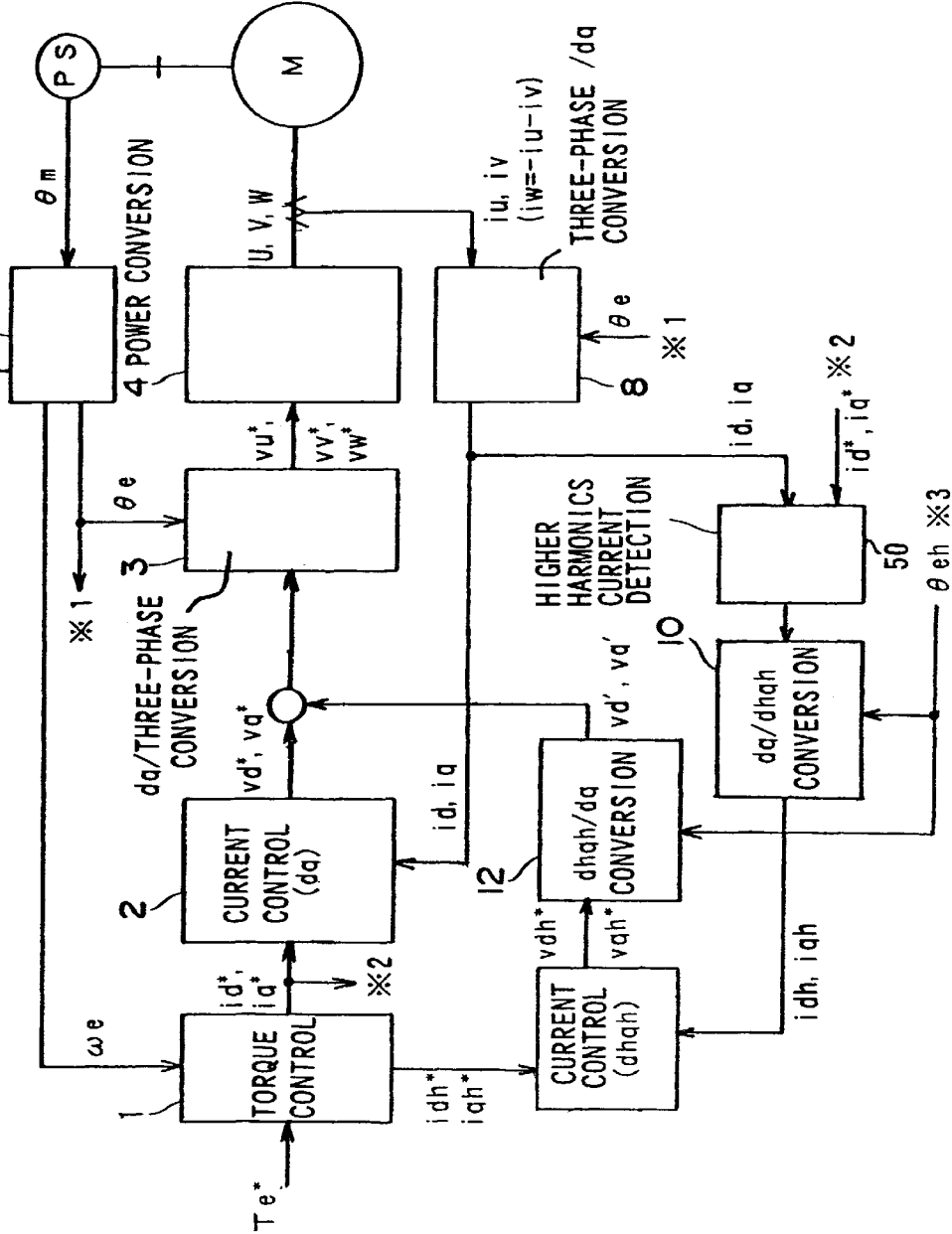
FIG. 17 shows the structure adopted in the motor control apparatus in a tenth embodiment.

FIG. 17 shows the structure adopted in the motor control apparatus in the tenth embodiment. It is to be noted that the same reference numerals are assigned to devices identical to those shown in FIG. 1 to preclude the necessity for a repeated explanation thereof and that such devices are shown in single-line delineation. The structure adopted in the fundamental current control circuit is identical to the structure of the fundamental current control circuit in the first embodiment illustrated in FIG. 1 and its explanation is therefore omitted.

The motor control apparatus in the tenth embodiment differs from the motor control apparatus shown in FIG. 1 in that it is provided with a higher harmonics current detection unit 50. Namely, while the high pass filter 9 is utilized to detect the higher harmonics components of the actual currents id and iq along the d-axis and the q-axis in the motor control apparatus in the first embodiment, the higher harmonics current detection unit 50 is employed to detect the higher harmonics components in the motor control apparatus in the ninth embodiment. The higher harmonics current detection unit 50 estimates current response values for the current command values id* and iq* and detects the higher harmonics components of the d-axis current id and the q-axis current iq using the estimated current response values and the d-axis current id and the q-axis current iq obtained through the conversion implemented at the three-phase/dq conversion unit 8.

Figure 18:
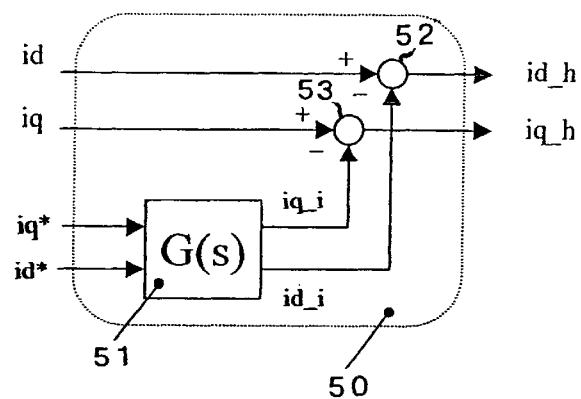
FIG. 18 is a block diagram of the structure adopted in the higher harmonics current detection unit in the motor control apparatus in the tenth embodiment.
Figure 19:
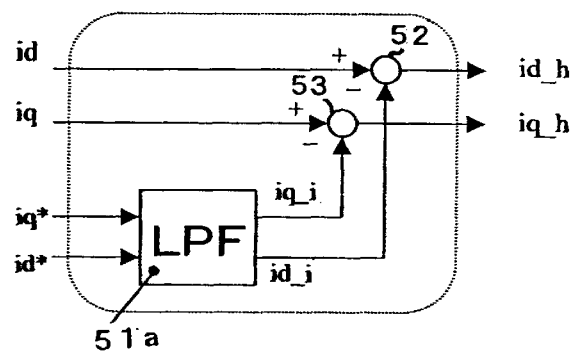
FIG. 19 is a block diagram of the structure adopted in a higher harmonics current detection unit constituted by using a low pass filter in the current response estimating unit.

FIG. 18 is a block diagram showing the structure of the higher harmonics current detection unit 50. A current response estimating unit 51 has a transfer function G(s) for outputting estimated current response values id_i and iq_i corresponding to the d-axis and q-axis current command values id* and iq*. When the current control at the fundamental wave current control unit 2 is achieved through, for instance, PI control, the transfer function G(s) may be realized through a low pass filter (LPF) 51a as shown in FIG. 19. In this case, the time constant at the low pass filter 51a is equal to the time constant at the fundamental wave current control unit 2.

The d-axis current command value id* and the q-axis current command value iq* are input to the current response estimating unit 51, and by utilizing the low pass filter 51a, for instance, the estimated current response values id_i and iq_i are ascertained to be output to subtractors 52 and 53 respectively. The subtractor 52 subtracts the estimated current response value id_i along the d-axis from the d-axis actual current id to calculate a higher harmonics component id_h of the d-axis current. In addition, the subtractor 53 subtracts the estimated current response value iq_i along the q-axis from the q-axis actual current iq to calculate the higher harmonics component iq_h of the q-axis current. It is to be noted that the phase characteristics and the gain characteristics of the estimated current response values corresponding to the d-axis current command value id* and the q-axis current command value iq* are identical to the phase characteristics and the gain characteristics at the fundamental wave current control unit 2. If the fundamental wave current control unit 2 implements control other than PI control, a transfer function corresponding to the control system should be used.

When detecting the higher harmonics components of the d-axis and q-axis currents by using the high pass filter 9 in FIG. 1, a change occurring in a fundamental current may pass through the high pass filter 9 and be detected as a higher harmonics component. If higher harmonics components are detected erroneously, an error occurs in the three-phase AC voltage command values vu*, vv* and vw* provided to the power conversion unit 4 resulting in reduced accuracy in the motor control. If, on the other hand, the higher harmonics components of the d-axis and q-axis currents are detected by utilizing the higher harmonics current detection unit 50 instead of the high pass filter 9, the higher harmonics components id_h and iq_h do not contain changes occurring in the fundamental currents even after such changes occur in the fundamental currents. Namely, since the estimated current response values id_i and iq_i, too, change if the d-axis current command value id* and the q-axis current command value iq* change, the higher harmonics components calculated at the subtractors 52 and 53 by subtracting the estimated current response values having undergone the changes do not reflect the changes in the fundamental currents.

Figure 21:
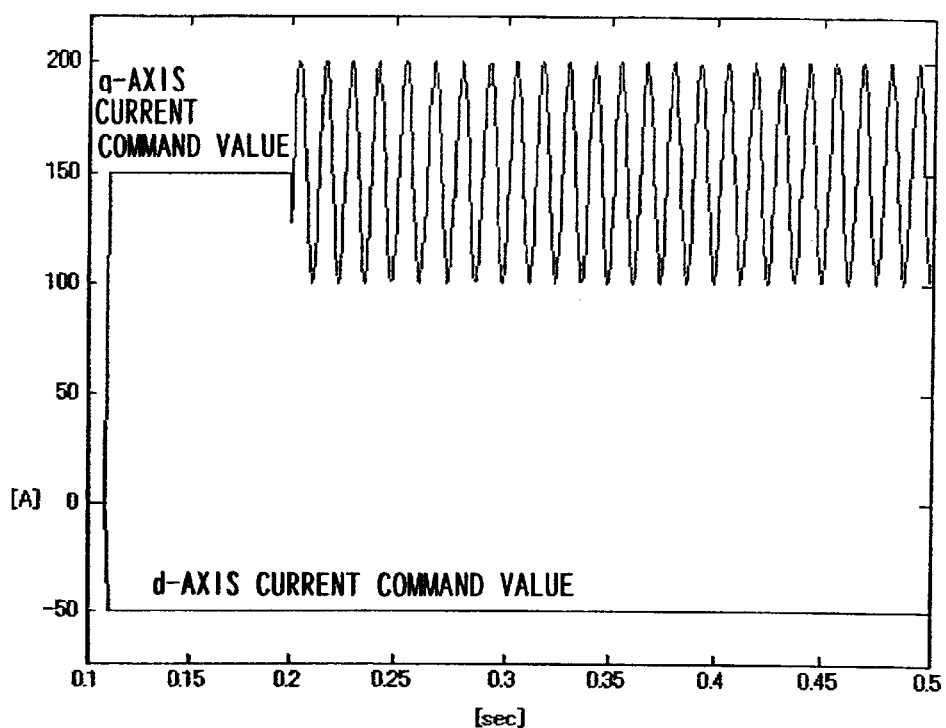
FIG. 21 shows the d-axis current command value and q-axis current command value.
Figure 22:
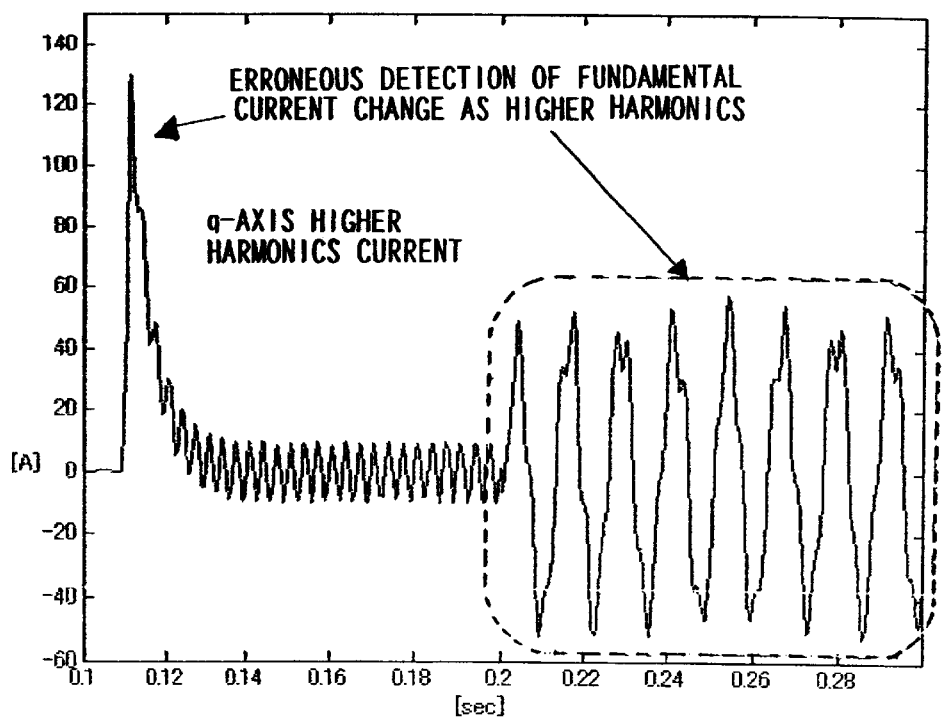
FIG. 22 shows the q-axis higher harmonics current detected by the motor control apparatus in the first embodiment in correspondence to the current command value in FIG. 21.

In reference to FIGS. 21~25, the control results obtained through a simulation implemented on the motor control apparatus in the first embodiment are compared against the control results obtained through a simulation implemented on the motor control apparatus in the tenth embodiment. FIG. 21 shows changes occurring in the d-axis current command value and the q-axis current command value over time. FIG. 22 presents the results of q-axis higher harmonics current detection implemented by using the motor control apparatus in the first embodiment in correspondence to the current command value shown in FIG. 21. The scale of the vertical axis is −60 (A)~150 (A). As shown in FIG. 22, the detected q-axis higher harmonics current contains the change occurring in the fundamental current.

Figure 23:
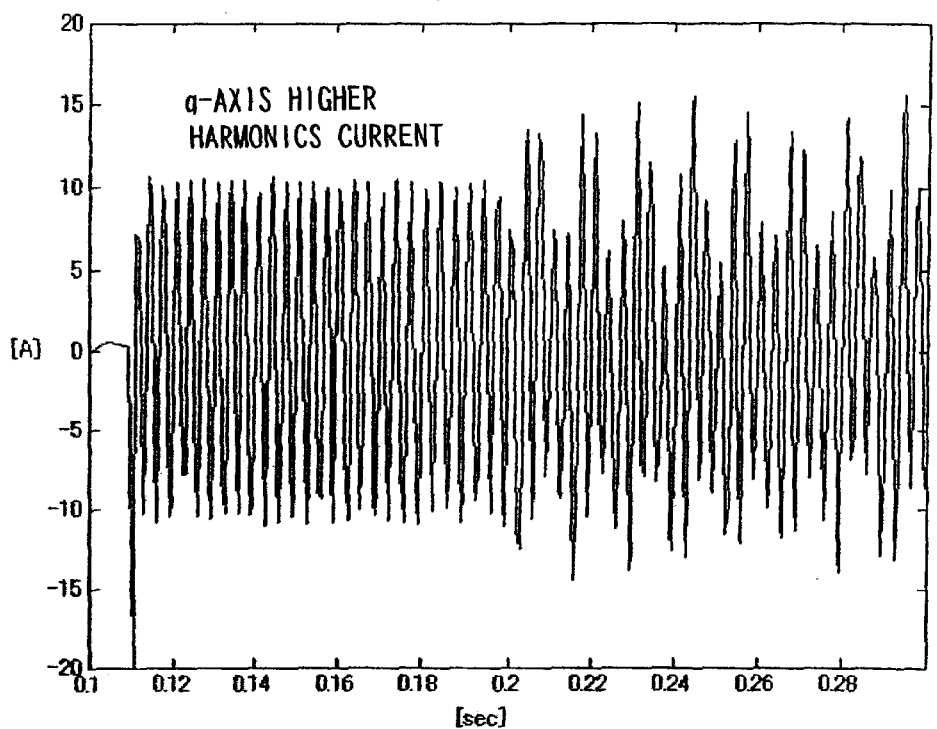
FIG. 23 shows the q-axis higher harmonics current detected by the motor control apparatus in the tenth embodiment in correspondence to the current command value in FIG. 21.
Figure 24:
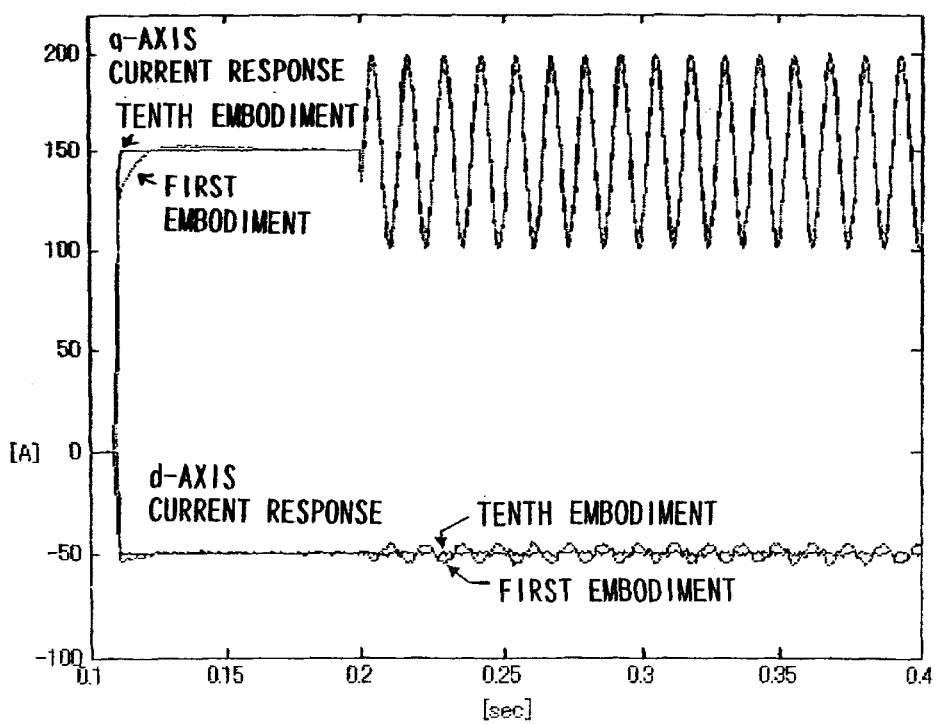
FIG. 24 shows the d-axis current response value and q-axis current response value corresponding to the current command values shown in FIG. 21.
Figure 25:
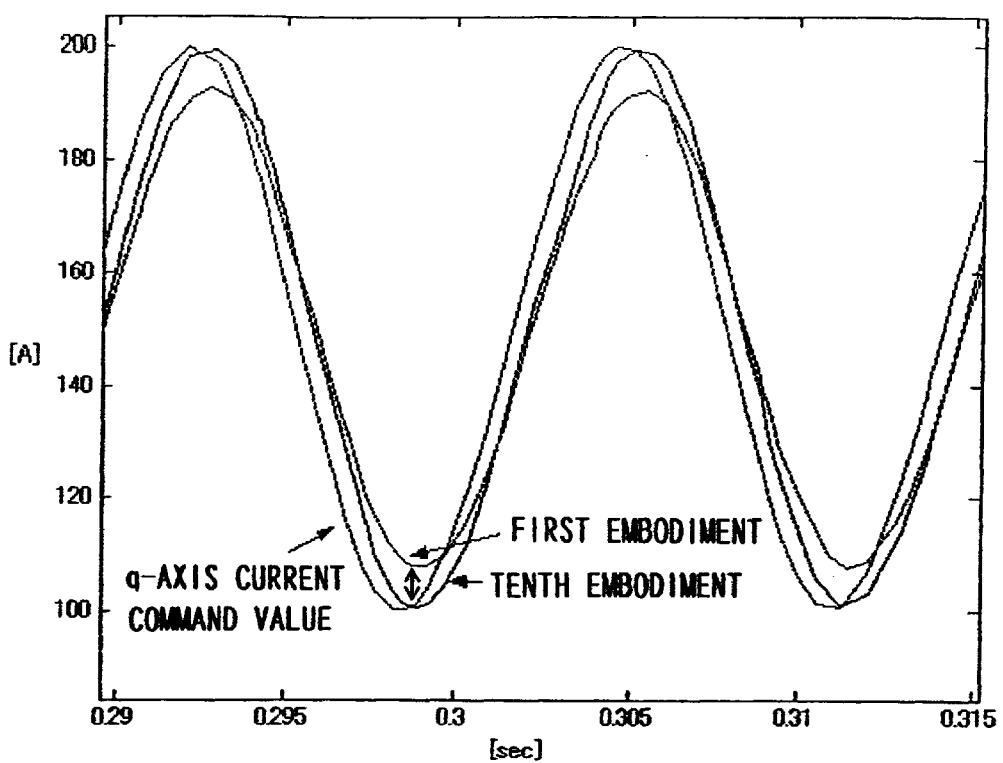
FIG. 25 is a partial enlargement of FIG. 24.

FIG. 23 presents the results of q-axis higher harmonics current detection implemented by employing the motor control apparatus in the tenth embodiment in correspondence to the current command value shown in FIG. 21. The scale of the vertical axis is −20 (A)~20 (A). The detected q-axis higher harmonics current fluctuates only to a small degree, demonstrating that the change in the fundamental current is not included. FIGS. 24 and 25 show response values relative to the current command values shown in FIG. 21 obtained by setting higher harmonics current command values to idh=0 and iqh=0. As FIG. 24 indicates, the d-axis current fluctuates when the control is implemented by the motor control apparatus in the first embodiment. In contrast, the fluctuation of the d-axis current is suppressed through the control implemented by the motor control apparatus in the tenth embodiment, thereby achieving an improvement in the control accuracy. In addition, the response of the q-axis current to the current command values is improved.

FIG. 25, which is a partial enlargement of FIG. 24, presents the results of the control achieved by the motor control apparatus in the first embodiment in conformance to the q-axis current command value and the results of the control implemented by the motor control apparatus in the tenth embodiment in conformance to the q-axis current command value. As shown in the figure, better control accuracy is achieved through the control implemented by the motor control apparatus in the tenth embodiment with regard to the response value of the q-axis current relative to the current command value. As explained earlier, since a change occurring in the fundamental current is detected as a higher harmonics current in the control implemented by the motor control apparatus in the first embodiment, the control accuracy is compromised with regard to the control on both the d-axis current and the q-axis current. Since no fundamental current is contained in a detected higher harmonics current through the control implemented by the motor control apparatus in the tenth embodiment, the control accuracy with regard to the control on the d-axis current and the q-axis current is improved.

The time constant of the low pass filter 51a employed in the motor control apparatus in the tenth embodiment is a fixed value which is equal to the time constant at the fundamental wave current control unit 2. This time constant maybe a varied. During the actual control process, the state of the motor M changes, e.g., the resistance of the motor M changes as the temperature fluctuates and the inductance changes in response to the motor currents. In such a case, if control is implemented through a first-order delay system having a fixed time constant, an error manifests as a deviation of the current response values relative to the current command values. In order to prevent such an error, the time constant at the low pass filter 51a may be varied to achieve an improvement in the detection accuracy with which the higher harmonics currents are detected.

Figure 20:
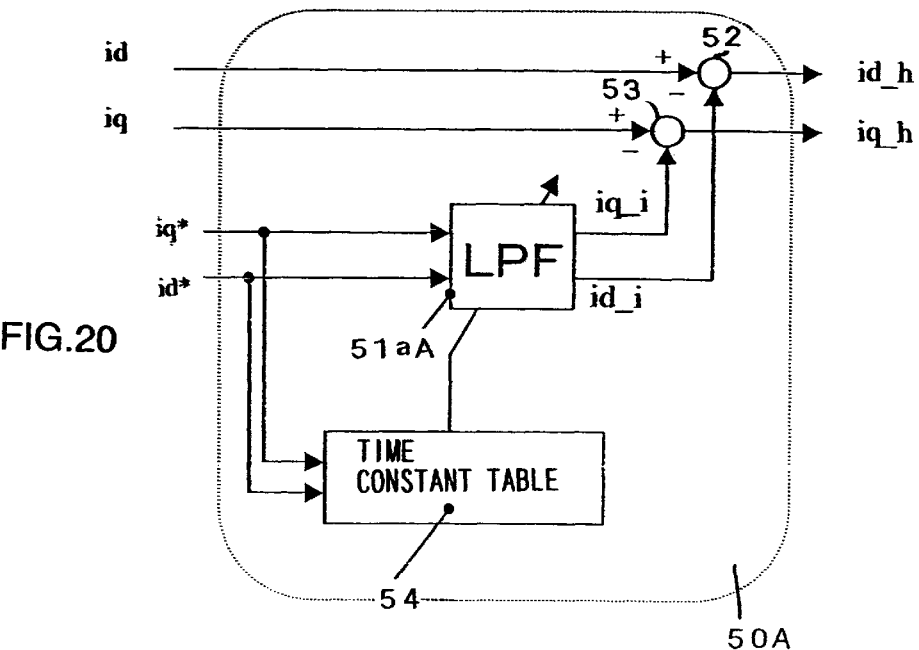
FIG. 20 is a block diagram of the structure adopted in the higher harmonics current detection unit when the time constant at the low pass filter is variable.

FIG. 20 is a block diagram of the structure of a higher harmonics current detection unit 50A having a variable time constant at the low pass filter 51a. A time constant table 54 is used to set the time constant of a low pass filter 51aA in correspondence to the command values id* and iq* along the d-axis and the q-axis. The relationship between the current command values id* and iq* and the time constant at the low pass filter 51aA is ascertained in advance through testing. The low pass filter 51aA implements filter processing by using the time constant obtained from the time constant table 54 and outputs the estimated current response values id_i and iq_i to the subtractors 52 and 53.

In the motor control apparatus in the tenth embodiment, even when a change occurs in a fundamental current, the change in the fundamental current is not detected as a higher harmonics current, to enable a reliable detection of the higher harmonics current. In addition, by setting the time constant at the low pass filter 51aA in correspondence to the current command values id* and iq*, an even more accurate higher harmonics current detection is enabled.

It is to be noted that the time constant at the low pass filter 51aA stored in the time constant table 54 may be a value corresponding to the d-axis current id and the q-axis current iq instead of the current command values id* and iq*.

(Eleventh Embodiment)

Figure 26:
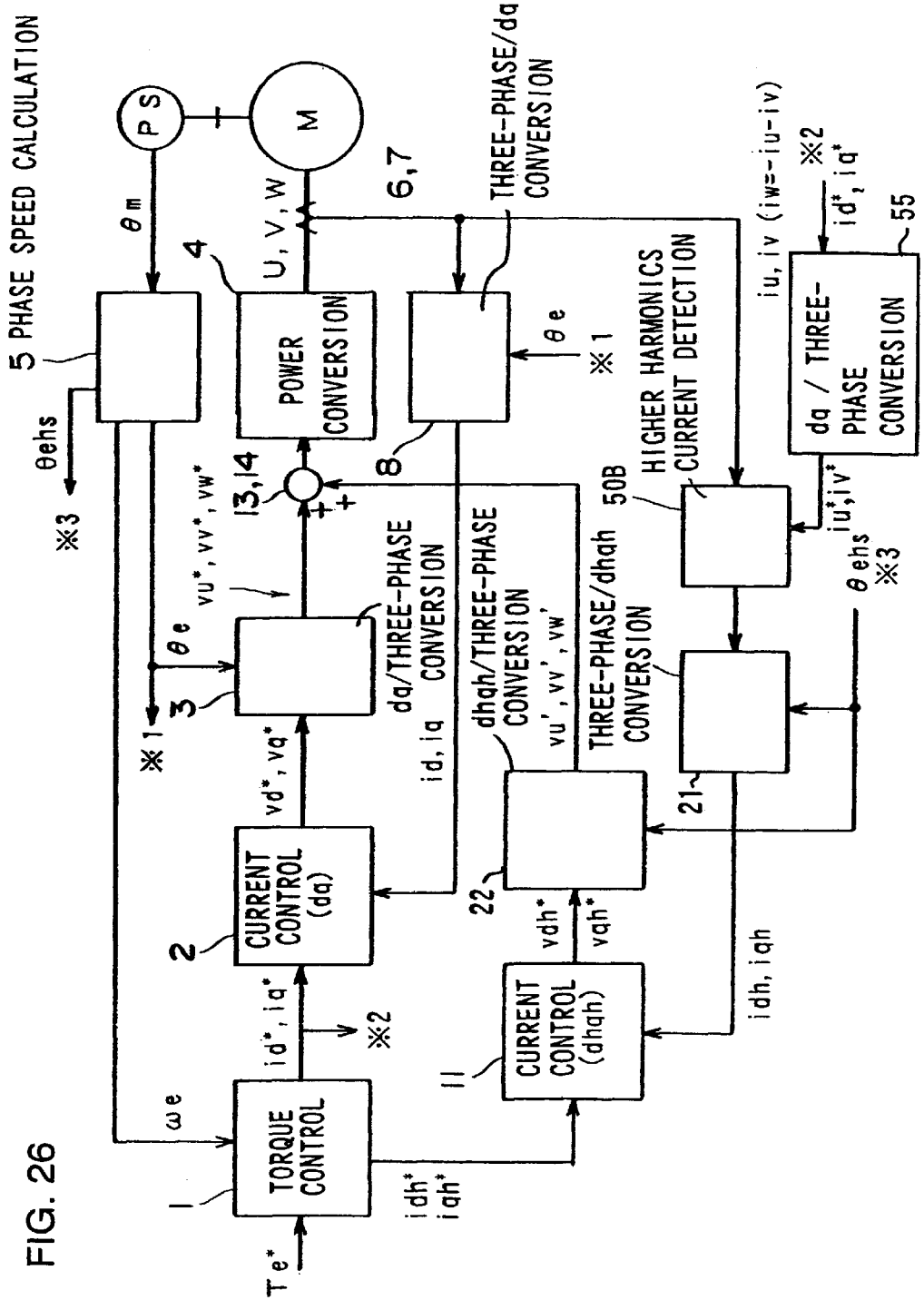
FIG. 26 shows the structure adopted in the motor control apparatus in an eleventh embodiment.

The motor control apparatus in the tenth embodiment is achieved by replacing the high pass filter 9 in the motor control apparatus in the first embodiment with the higher harmonics current detection unit 50. In the motor control apparatus in the eleventh embodiment, the high pass filter 9 in the motor control apparatus in the seventh embodiment is replaced by a higher harmonics current detection unit 50B. In addition, it is provided with a dq/three-phase conversion unit 55 to input current command values iu* and iv* to the higher harmonics current detection unit 50B. FIG. 26 shows the structure adopted in the motor control apparatus in the eleventh embodiment.

Figure 27:
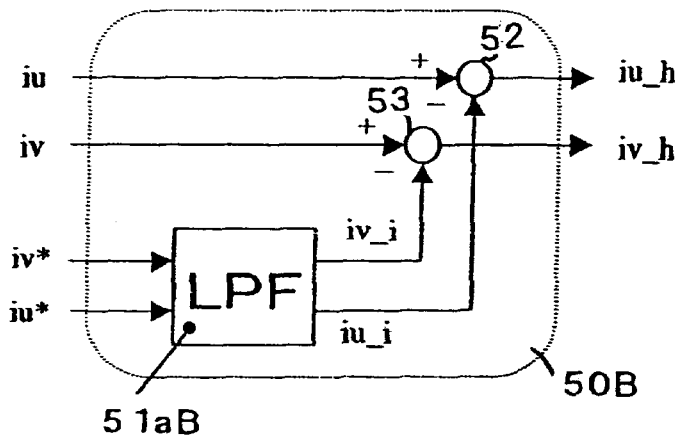
FIG. 27 is a block diagram of the structure adopted in the higher harmonics current detection unit in the motor control apparatus in the eleventh embodiment.

FIG. 27 is a block diagram showing the structure of the higher harmonics current detection unit 50B. The current command values iu* and iv* obtained through the conversion performed at the dq/three-phase conversion unit 55 are input to a low pass filter 51aB. The input current command values iu* and iv* undergo filter processing at the low pass filter 51aB to obtain estimated current response values iu_i and iv_i. The subtractor 52 subtracts a U-phase estimated current response value iu_i from the U-phase current iu to ascertain the higher harmonics component iu_h of the U-phase current. In addition, the subtractor 53 subtracts the V-phase estimated current response value iv_i from a V-phase current iv to ascertain a higher harmonics component iv_h of the V-phase current. The higher harmonics components iu_h and iv_h thus obtained are both output to the three-phase/dhqh conversion unit 21.

Figure 28:
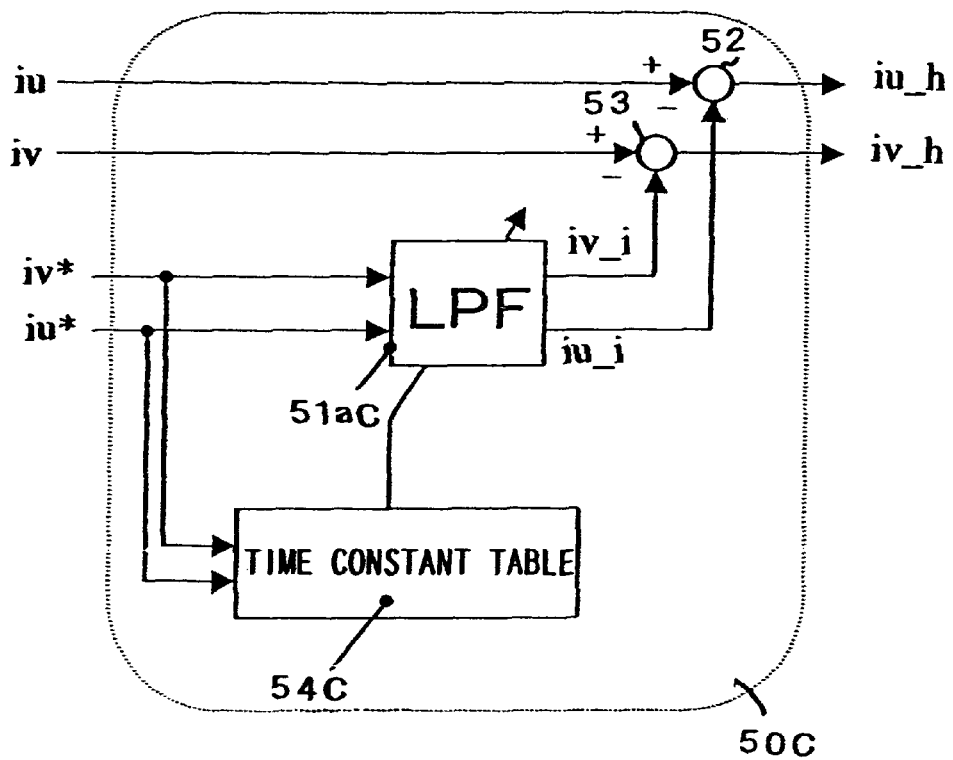
FIG. 28 is a block diagram of the structure adopted in the higher harmonics current detection unit in the eleventh embodiment when the time constant at the low pass filter is variable.

Furthermore, the time constant at the low pass filter 51aB may be varied as in the fifth embodiment. FIG. 28 presents a block diagram of the structure of a higher harmonics current detection unit 50C with the low pass filter 51aB having a variable time constant. In a time constant table 54C, data of the time constant of a low pass filter 51aC are stored in correspondence to the U-phase current command value iu* and V-phase current command value iv*. By using a variable time constant at the low pass filter 51aC, advantages similar to those achieved by using a variable time constant at the low pass filter 51aA in the tenth embodiment are realized. It is to be noted that the time constant at the low pass filter 51aC stored in the time constant table 54C may be a value corresponding to the U-phase current iu and the V-phase current iv instead of the current command values iu* and iv*.

The motor control apparatus in the eleventh embodiment achieves the advantages similar to those realized in the motor control apparatus in the tenth embodiment.

(Twelfth Embodiment)

Figure 29:
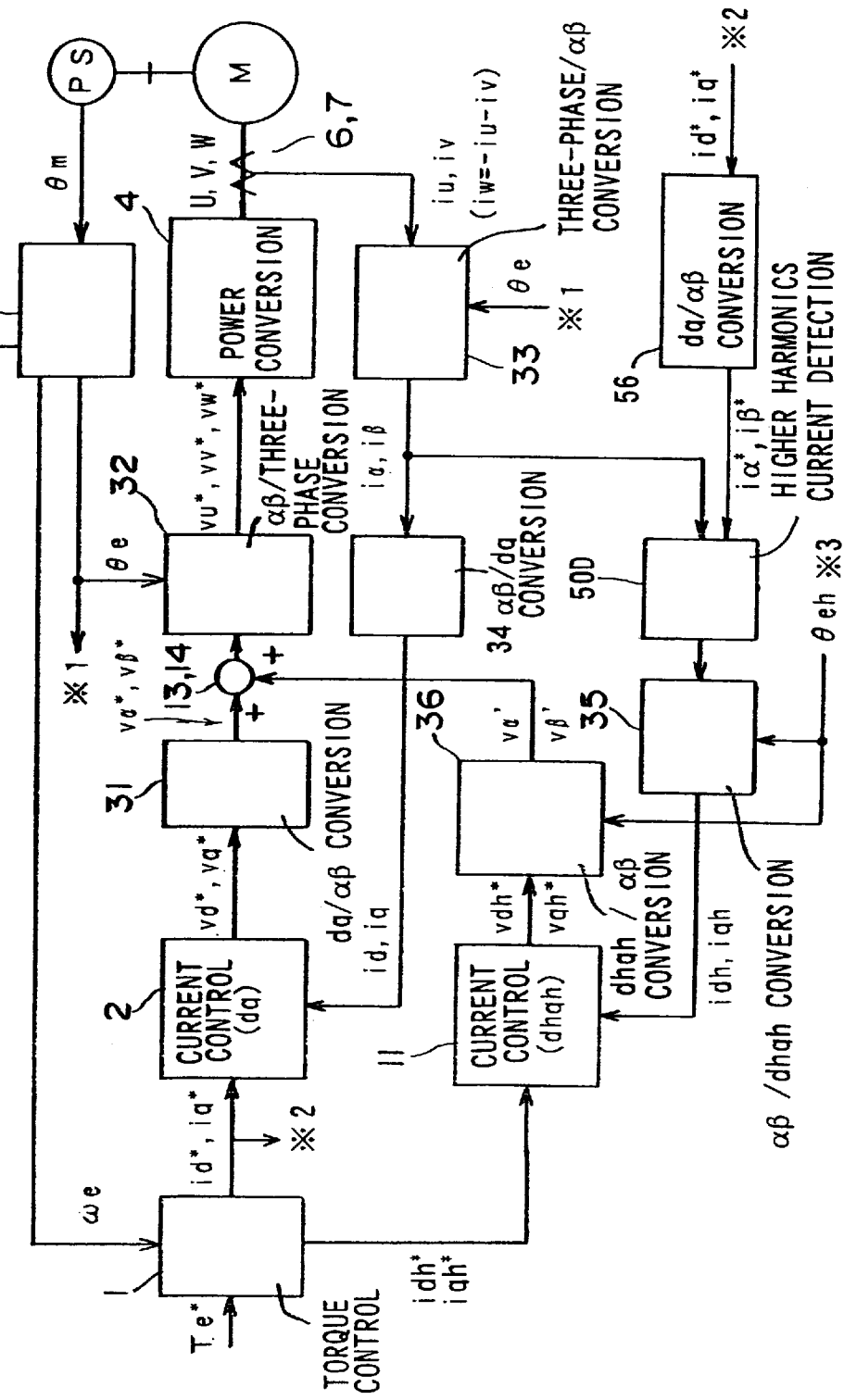
FIG. 29 shows the structure adopted in the motor control apparatus in a twelfth embodiment.

FIG. 29 shows the structure adopted in the motor control apparatus in the twelfth embodiment. The motor control apparatus in the twelfth embodiment is achieved by replacing the high pass filter 9 in the motor control apparatus in the eighth embodiment with a higher harmonics current detection unit 50D. In addition, it is provided with a dq/αβ conversion unit 56 to input current command values iα* and iβ* to the higher harmonics current detection unit 50D.

Figure 30:
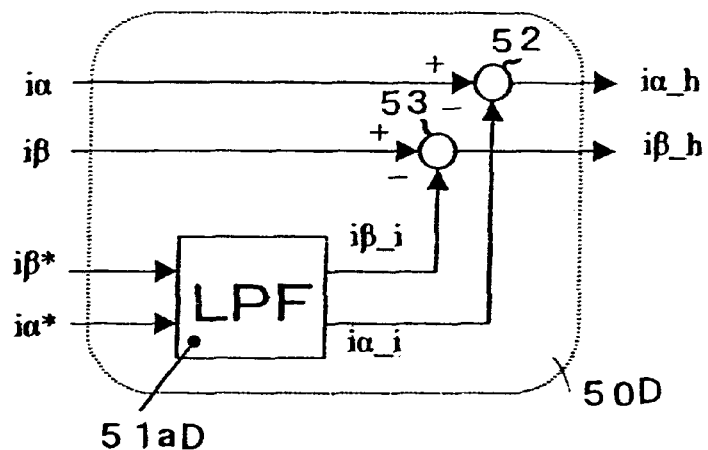
FIG. 30 is a block diagram of the structure adopted in the higher harmonics current detection unit in the motor control apparatus in the twelfth embodiment.

FIG. 30 is a block diagram showing the structure of the higher harmonics current detection unit 50D. Current command values iα* and iβ* obtained through the conversion performed at the dq/αβ conversion unit 56 are input to a low pass filter 51aD. The input current command values iα* and iβ* undergo filter processing at the low pass filter 51aD to obtain estimated current response values iα_i and iβ_i. The subtractor 52 subtracts an a-axis estimated current response value iα-i from an α-axis current iα to ascertain the higher harmonics component iα_h of the α-phase current. In addition, the subtractor 53 subtracts a β-phase estimated current response value iβi from a β-axis current iβ to ascertain the higher harmonics component iβ-h of the β-axis current. The higher harmonics components iα-h and iβ_h thus obtained are both output to the αβ/dhqh conversion unit 35.

Figure 31:
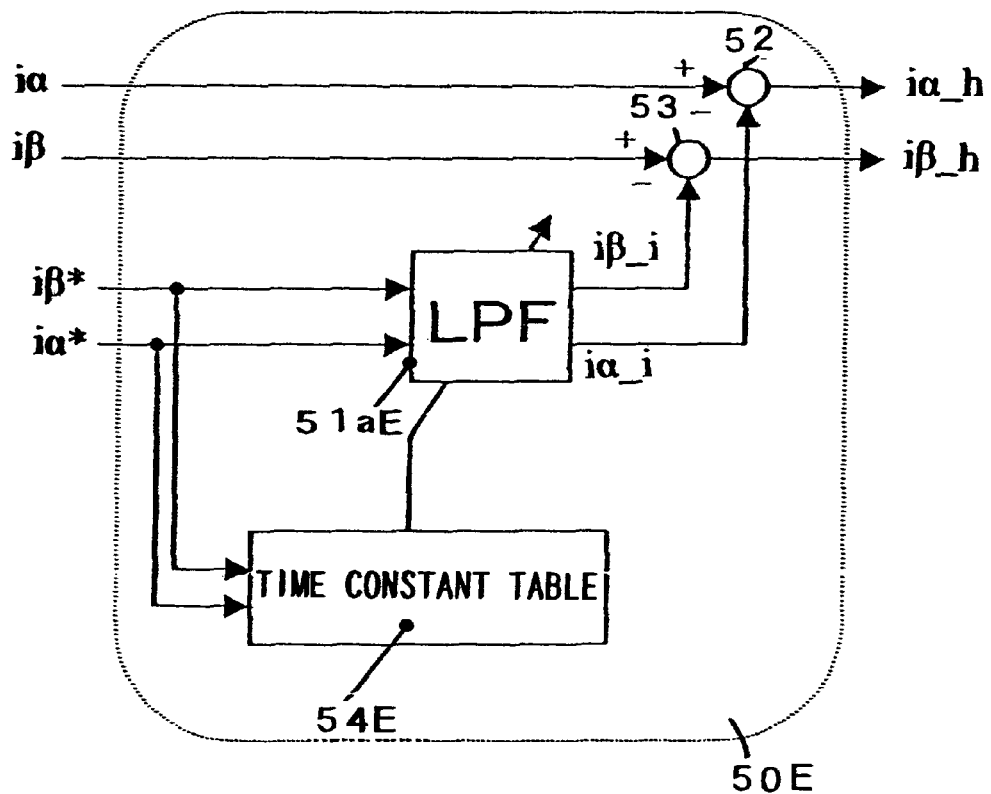
FIG. 31 is a block diagram of the structure adopted in the higher harmonics current detection unit in the twelfth embodiment when the time constant at the low pass filter is variable.

The time constant at the low pass filter 51aD may be varied as in the tenth and eleventh embodiments. FIG. 31 presents a block diagram of the structure of a higher harmonics current detection unit 50E with the low pass filter 51aE having a variable time constant. In a time constant table 54E, data of the time constant of a low pass filter 51aE corresponding to the α-axis current command value iα* and β-axis current command value iβ*. Since advantages similar to those achieved by using a variable time constant at the low pass filter 51aA in the tenth and eleventh embodiments are realized by using a variable time constant at the low pass filter 51aE, a detailed explanation thereof is omitted.

The motor control apparatus in the twelfth embodiment achieves the advantages similar to those realized in the motor control apparatuses in the tenth and eleventh embodiments.

(Thirteenth Embodiment)

Figure 32:
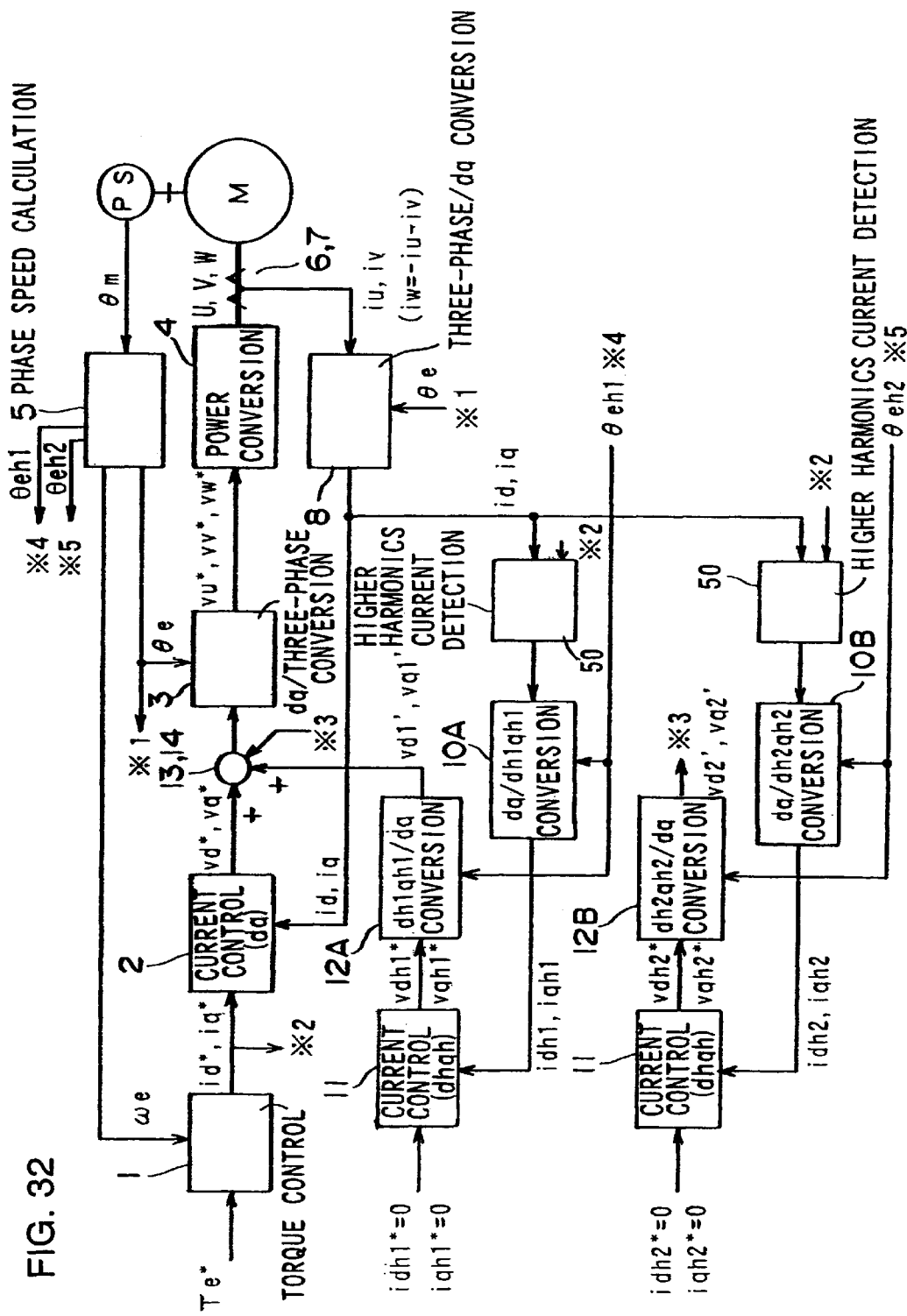
FIG. 32 shows the structure adopted in the motor control apparatus in a thirteenth embodiment.

The motor control apparatus in the thirteenth embodiment is achieved by replacing the high pass filter 9 in the motor control apparatus in the ninth embodiment with a higher harmonics current detection unit 50. The structure adopted in the motor control apparatus in the thirteenth embodiment is shown in FIG. 32. The structure of the higher harmonics current detection unit 50, which is identical to the higher harmonics current detection unit 50 utilized in the tenth embodiment, is as illustrated in FIGS. 18 and 19. In addition, the structure that is adopted in the higher harmonics current detection unit 50 when variable time constant is used for the low pass filter 51a is shown in FIG. 20. The motor control apparatus in the thirteenth embodiment, too, achieves advantages similar to those realized in the motor control apparatuses in the tenth~twelfth embodiments.

The present invention is not limited to the examples explained above. For instance, the order of the higher harmonics current components to undergo the control in the higher harmonics current control circuit in the motor control apparatuses in the first~thirteenth embodiments may be switched in correspondence to the motor control state such as the motor speed and the load applied to the motor. In other words, since the higher harmonics current components that are generated change as the motor drive state changes, the most pronounced higher harmonics current components should be the control target depending upon the motor drive state.

In addition, by adopting the structure of the torque control unit 1A in the second embodiment for the torque control unit in the seventh and eighth embodiments, similar advantages to those achieved in the motor control apparatus in the second embodiment are realized. Likewise, by assuming the structures of the torque control units 1B, 1C and 1D in the torque control unit 1, advantages similar to those achieved in the motor control apparatuses in the third, fourth and fifth embodiments are realized.

Furthermore, two sets of the higher harmonics control circuits in the motor control apparatus in the sixth embodiment are provided in the motor control apparatus in the ninth embodiment. Likewise, in the motor control apparatus in the seventh embodiment, two sets of the higher harmonics control circuits having the dh-axis current command value idh* and the qh-axis current command value iqh* set to 0 may be provided, and two sets of the higher harmonics control circuits having the dh-axis current command value idh* and the qh-axis current command value iqh* set to 0 may be provided in the motor control apparatus in the eighth embodiment as well. In addition, the high pass filter 9 may be replaced by the higher harmonics current detection unit 50 in any of these variations.

While the fifth-order higher harmonics components and the seventh-order higher harmonics components are reduced in the ninth and thirteenth embodiments in which the higher harmonics components of the fifth order and the seventh order are prominent in the higher harmonics currents contained in the motor currents, the orders of the higher harmonics components to be reduced are not limited to these. In other words, an order at which significant higher harmonics components are present in the higher harmonics current should be reduced. Furthermore, while an explanation is given in reference to the ninth and thirteenth embodiments on an example in which mainly the higher harmonics components of two orders, i.e., the fifth order and the seventh order, are reduced, the higher harmonics components of three orders or more may be reduced instead. In such a case, the number of higher harmonics current control circuit that should be provided corresponds to the number of orders of higher harmonics components to be reduced.

The type of alternating current motor in conjunction with which the motor control apparatus according to the present invention may be adopted is not limited to a three-phase alternating current motor and the present invention may be adopted in a synchronous motors or an induction motor. When the motor control apparatus according to the present invention is adopted in conjunction with an induction motor, a magnetic flux estimating instrument in the earlier technology should be provided to estimate the direction of the magnetic flux, the dq coordinate system should be used as a coordinate system that rotates in synchronization with the estimated direction of the fundamental wave component of the magnetic flux and the dhqh coordinate system to be used as a coordinate system that rotates in synchronization with the estimated direction of the higher harmonics order components of the magnetic flux.

The disclosures of the following priority applications are herein incorporated by reference:

Japanese Patent Application No. 2000-356117 filed Dec. 22, 2000

Japanese Patent Application No. 2001-40550 filed Feb. 16, 2001

Japanese Patent Application No. 2001-276887 filed Sep. 12, 2001.

What is claimed is:

1. A motor control apparatus comprising:
   a fundamental current command value determining device that determines a fundamental current command value for a motor current;
   a higher harmonics current command value determining device that determines a higher harmonics current command value for the motor current; and a current control device that controls a current flowing to the AC motor based upon the fundamental current command value and the higher harmonics current command value, wherein said fundamental current command value determining device sets the fundamental current command value based upon at least a torque command value for an AC motor, said higher harmonics current command value determining device sets the higher harmonics current command value based upon at least a torque command value of the AC motor, and said current control device includes a fundamental wave current control device that implements control so as to match a fundamental wave component of the motor current with the fundamental current command value in a dq coordinate system that rotates in synchronization with a fundamental wave component of an armature flux linkage and a higher harmonics current control device that implements control so as to match a higher harmonics order component of the motor current with the higher harmonics current command value in a dhqh coordinate system that rotates in synchronization with a higher harmonics order component of the armature flux linkage.

2. A The motor control apparatus according to claim 1, wherein:

said fundamental current command value determining device and said higher harmonics current command value determining device determine a fundamental current command value and a higher harmonics current command value respectively that maximizes efficiency while matching a motor torque to the torque command value.

3. The motor control apparatus according to claim 1, wherein:

said fundamental current command value determining device and said higher harmonics current command value determining device determine a fundamental current command value and a higher harmonics current command value respectively that minimize torque ripple while matching a motor torque to the torque command value.

4. The motor control apparatus according to claim 1, wherein:

said fundamental current command value determining device and said higher harmonics current command value determining device determine a fundamental current command value and a higher harmonics current command value respectively that minimizes voltage ripple while matching a motor torque to the torque command value.

5. The motor control apparatus according to claim 1, wherein:

said fundamental current command value determining device and said higher harmonics current command value determining device determine a fundamental current command value and a higher harmonics current command value respectively that minimizes current ripple while matching a motor torque to the torque command value.

6. A motor control apparatus comprising:

a fundamental current command value determining device that determines a fundamental current command value for a motor current;

a higher harmonics current command value determining device that determines a higher harmonics current command value for the motor current; and a current control device that controls a current flowing to the AC motor based upon the fundamental current command value and the higher harmonics current command value, wherein said fundamental current command value determining device sets the fundamental current command value based upon at least a torque command value for an AC motor, said higher harmonics current command value determining device sets the higher harmonics current command value based upon at least a torque command value of the AC motor, and said fundamental current command value determining device and said higher harmonics current command value determining device determine a fundamental current command value and a higher harmonics current command value respectively that maximize efficiency while matching a motor torque to the torque command value, a fundamental current command value and a higher harmonics current command value that minimizes torque ripple while matching a motor torque to the torque command value, a fundamental current command value and a higher harmonics current command value that minimize voltage ripple while matching a motor torque to the torque command value and a fundamental current command value and a higher harmonics current command value that minimizes current ripple while matching a motor torque to the torque command value; and said motor control apparatus further includes:

an operating state detection device that detects a motor operating state; and a current command value selection device that selects optimal current command values corresponding to a motor operating state among fundamental current command values and higher harmonics current command values determined by said fundamental current command value determining device and said higher harmonics current command value determining device respectively.

7. The motor control apparatus according to claim 6, wherein:

said current command value selection device selects the fundamental current command value and the higher harmonics current command value for minimizing the current ripple while matching a motor torque to the torque command value if a motor operating state in which the motor torque is within a specific range close to a maximum value is detected.

8. The motor control apparatus according to claim 6, wherein:

said current command value selection device selects the fundamental current command value and the higher harmonics current command value for minimizing a torque ripple while matching a motor torque to the torque command value if a motor operating state in which the motor torque and the motor rotating speed are both within a specific low range is detected.

9. A The motor control apparatus according to claim 6, wherein:

said current command value selection device selects the fundamental current command value and the higher harmonics current command value for minimizing a voltage ripple while matching a motor torque to the torque command value if a motor operating state in which the motor output is within a specific range close to a maximum value is detected.

10. The motor control apparatus according to claim 6, wherein:
said current command value selection device selects the fundamental current command value and the higher harmonics current command value for maximizing an efficiency while matching a motor torque to the torque command value if an operating state in which a motor torque and a motor output are not within the specific ranges over which the motor torque and the motor output are close to the maximum values and the motor torque and the motor rotating speed are not within the specific low ranges is detected.

11. A motor control apparatus comprising:
a fundamental current command value determining device that determines a fundamental current command value for a motor current;
a higher harmonics current command value determining device that determines a higher harmonics current command value for the motor current; and
a current control device that controls a current flowing to the AC motor based upon the fundamental current command value and the higher harmonics current command value, wherein
said current control device includes a fundamental wave current control device that implements control so as to match a fundamental wave component of a motor current with the fundamental current command value in a dq coordinate system that rotates in synchronization with a fundamental wave component of an armature flux linkage and a higher harmonics current control device that implements control so as to match a higher harmonics order component of the motor current with the higher harmonics current command value in a dhqh coordinate system that rotates in synchronization with a higher harmonics order component of the armature flux linkage;
said higher harmonics order component is a higher harmonics component of a specific order manifesting when the motor current is controlled in said dq coordinate system alone; and
said higher harmonics current command value determining device sets a higher harmonics current command value corresponding to the specific order in a higher harmonics component contained in the motor current to 0.

12. The motor control apparatus according to claim 11, wherein:
the higher order harmonics component to undergo control is switched in correspondence to a motor drive state.

13. The motor control apparatus according to claim 11, having a plurality of said higher harmonics current control devices provided in correspondence to a plurality of orders of higher harmonics currents.

14. The motor control apparatus according to claim 13, wherein:
the order in which higher harmonics of the plurality of orders are to undergo control in said higher harmonics current control device is determined by giving higher priority to orders at which greater higher harmonics components manifest in motor currents.

15. A motor control apparatus comprising:
a fundamental current command value determining device that determines a fundamental current command value for a motor current;
a higher harmonics current command value determining device that determines a higher harmonics current command value for the motor current; and
a current control device that controls a current flowing to the AC motor based upon the fundamental current command value and the higher harmonics current command value, wherein
said current control device includes a fundamental wave current control device that implements control so as to match a fundamental wave component of a motor current with said fundamental current command value in a dq coordinate system that rotates in synchronization with a fundamental wave component of an armature flux linkage and a higher harmonics current control device that implements control so as to match a higher harmonics order component of the motor current with the higher harmonics current command value in a dhqh coordinate system that rotates in synchronization with a higher harmonics order component of the armature flux linkage; and
said higher harmonics current control device converts the motor current to a current in said dq coordinate system, detects a higher harmonics component of the current in said dq coordinate system resulting from the conversion and converts the higher harmonics component to a higher harmonics current in said dhqh coordinate system.

16. The motor control apparatus according to claim 15, wherein:
said higher harmonics current control device includes;
a current response value estimating device that estimates a current response value relative to a current command value in said dq coordinate system; and
a higher harmonics current detection device that detects a higher harmonics current by subtracting the current response value estimated by said current response estimating device from the current value in said dq coordinate system.

17. The motor control apparatus according to claim 16, wherein:
said current response value estimating device is a low pass filter.

18. A The motor control apparatus according to claim 17, wherein:
a time constant at said low pass filter changes as a motor state changes.

19. A motor control apparatus comprising:
a fundamental current command value determining device that determines a fundamental current command value for a motor current;
a higher harmonics current command value determining device that determines a higher harmonics current command value for the motor current; and
a current control device that controls a current flowing to the AC motor based upon the fundamental current command value and the higher harmonics current command value, wherein
said current control device includes a fundamental wave current control device that implements control so as to match a fundamental wave component of a motor current with the fundamental current command value in a dq coordinate system that rotates in synchronization with a fundamental wave component of an armature flux linkage and a higher harmonics current control device that implements control so as to match a higher harmonics order component of the motor current with the higher harmonics current command value in a dhqh coordinate system that rotates in synchronization with a higher harmonics order component of the armature flux linkage; and said higher harmonics current control device detects a higher harmonics component of the motor current and converts the higher harmonics component to a higher harmonics current in said dhqh coordinate system.

20. The motor control apparatus according to claim 19, wherein:

said higher harmonics current control device includes;

a current response value estimating device that estimates a current response value relative to a motor current command value; and a higher harmonics current detection device that detects a higher harmonics current by subtracting the current response value estimated by said current response estimating device from the fundamental current value.

21. A motor control apparatus comprising:

a fundamental current command value determining device that determines a fundamental current command value for a motor current;

a higher harmonics current command value determining device that determines a higher harmonics current command value for the motor current; and a current control device that controls a current flowing to the AC motor based upon the fundamental current command value and the higher harmonics current command value, wherein said current control device includes a fundamental wave current control device that implements control so as to match a fundamental wave component of a motor current with the fundamental current command value in a dq coordinate system that rotates in synchronization with a fundamental wave component of an armature flux linkage and a higher harmonics current control device that implements control so as to match a higher harmonics order component of the motor current with the higher harmonics current command value in a dhqh coordinate system that rotates in synchronization with a higher harmonics order component of the armature flux linkage; and said higher harmonics current control device converts the motor current to a current in an $\alpha\beta$ orthogonal coordinate system fixed to a stator of the motor, detects a higher harmonics component of the current in said $\alpha\beta$ coordinate system and converts the detected higher harmonics component to a higher harmonics current in said dhqh coordinate system.

22. The motor control apparatus according to claim 21, wherein:

said higher harmonics current control device includes;

a current response value estimating device that estimates a current response value relative to a current command value in said $\alpha\beta$ coordinate system; and a higher harmonics current detection device that detects a higher harmonics current by subtracting the current response value estimated by said current response estimating device from the current value in said $\alpha\beta$ coordinate system.

* * * * *